US008558846B2

(12) United States Patent
Ogikubo et al.

(10) Patent No.: US 8,558,846 B2
(45) Date of Patent: Oct. 15, 2013

(54) INFORMATION PROCESSING DEVICE AND METHOD, AND PROGRAM

(75) Inventors: Junichi Ogikubo, Kanagawa (JP); Norimasa Ozaki, Kanagawa (JP); Jun Onuki, Kanagawa (JP); Keita Shirane, Kanagawa (JP)

(73) Assignee: Sony Corporation, Tokyo (JP)

( * ) Notice: Subject to any disclaimer, the term of this patent is extended or adjusted under 35 U.S.C. 154(b) by 655 days.

(21) Appl. No.: 12/401,187

(22) Filed: Mar. 10, 2009

(65) Prior Publication Data
US 2009/0256858 A1    Oct. 15, 2009

(30) Foreign Application Priority Data

Apr. 11, 2008   (JP) ................................. 2008-103390

(51) Int. Cl.
G09G 5/00   (2006.01)
(52) U.S. Cl.
USPC ........... 345/620; 345/619; 345/626; 345/629; 345/660
(58) Field of Classification Search
USPC ................................................ 345/619–689
See application file for complete search history.

(56) References Cited

U.S. PATENT DOCUMENTS

| | | | |
|---|---|---|---|
| 5,049,993 A * | 9/1991 | LeGall et al. ................. | 348/448 |
| 5,363,476 A | 11/1994 | Kurashige et al. | |
| 5,646,697 A | 7/1997 | Kurashige | |
| 5,649,032 A * | 7/1997 | Burt et al. ..................... | 382/284 |
| 6,020,932 A | 2/2000 | Kurashige et al. | |
| 6,219,459 B1 | 4/2001 | Kurashige | |
| 6,331,860 B1 * | 12/2001 | Knox ............................ | 345/620 |
| 8,132,096 B1 * | 3/2012 | Widdowson et al. ......... | 715/243 |
| 2003/0159143 A1 | 8/2003 | Chan | |
| 2005/0206654 A1 * | 9/2005 | Vaha-Sipila .................. | 345/632 |
| 2006/0204079 A1 * | 9/2006 | Yamaguchi ................... | 382/154 |

FOREIGN PATENT DOCUMENTS

| | | |
|---|---|---|
| JP | 2000-83193 | 3/2000 |
| JP | 3117097 | 10/2000 |
| JP | 3480648 | 10/2003 |
| JP | 3503168 | 12/2003 |
| JP | 2005-107967 | 4/2005 |
| JP | 3700871 | 7/2005 |
| JP | 2005-354332 | 12/2005 |
| JP | 4003508 | 8/2007 |

OTHER PUBLICATIONS

European Office Action issued Aug. 11, 2011, in Patent Application No. 09 156 835.2.

(Continued)

Primary Examiner — Ke Xiao
Assistant Examiner — Jed-Justin Imperial
(74) Attorney, Agent, or Firm — Oblon, Spivak, McClelland, Maier & Neustadt, L.L.P.

(57) ABSTRACT

An information processing device includes: a clipping unit configured to subject a plurality of images to clipping processing for clipping a part of an image as a partial image to clip a partial image from each of the plurality of images; a size correcting unit configured to correct an image size regarding each of a plurality of the partial images clipped by the clipping unit; and a synthesizing unit configured to connect the partial images of which the image sizes have been corrected by the size correcting unit to generate a synthetic image.

20 Claims, 22 Drawing Sheets

(56) References Cited

OTHER PUBLICATIONS

Patrick Chiu, et al., "Stained-Glass Visualization for Highly Condensed Video Summaries", IEEE International Conference on Multimedia and Expo (ICME), XP 7904305, Jan. 1, 2004, pp. 2059-2062.

Chris Clementi, "Creating a collage using GIMP", www.kidsnetsoft.com/gimp/tutorial.pdf, 2007, pp. 1-12.

Wei-Ta Chu, et al., Tiling Sideshow: An Audiovisual Presentation Method for Consumer Photos, IEEE Multimedia, Acvances in Multimedia Computing, vol. 14, No. 3, XP011190041, Jul. 1, 2007, pp. 36-45.

Jun-Cheng Chen, et al., "Tiling Slideshow", Proceedings of the MM'06, XP007913307, Oct. 23, 2006, pp. 25-34.

European Office Action Issued Feb. 14, 2013 in Patent Application No. 09 156 835.2.

Allison W. Klein et al., "Video Mosaics", Symposium on Non-Photorealistic Animation and Rendering, XP001201006, Jun. 3-5, 2002, pp. 21-28.

Andrew Glassner, "Digital Cubism, Part 2", IEEE Computer Graphics and Applications, XP011115148, vol. 24, No. 4, Jul./Aug. 2004, pp. 84-95.

* cited by examiner

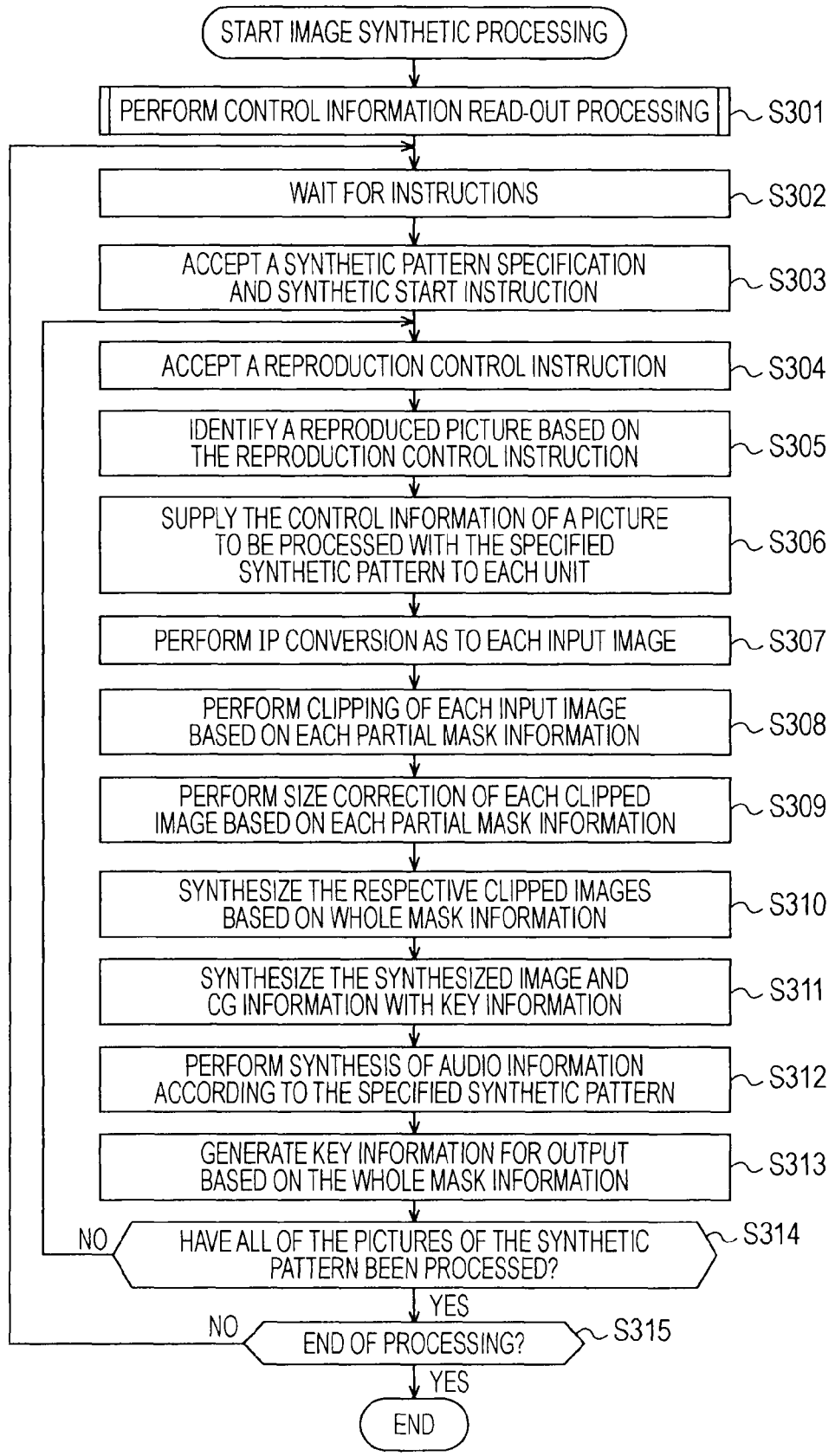

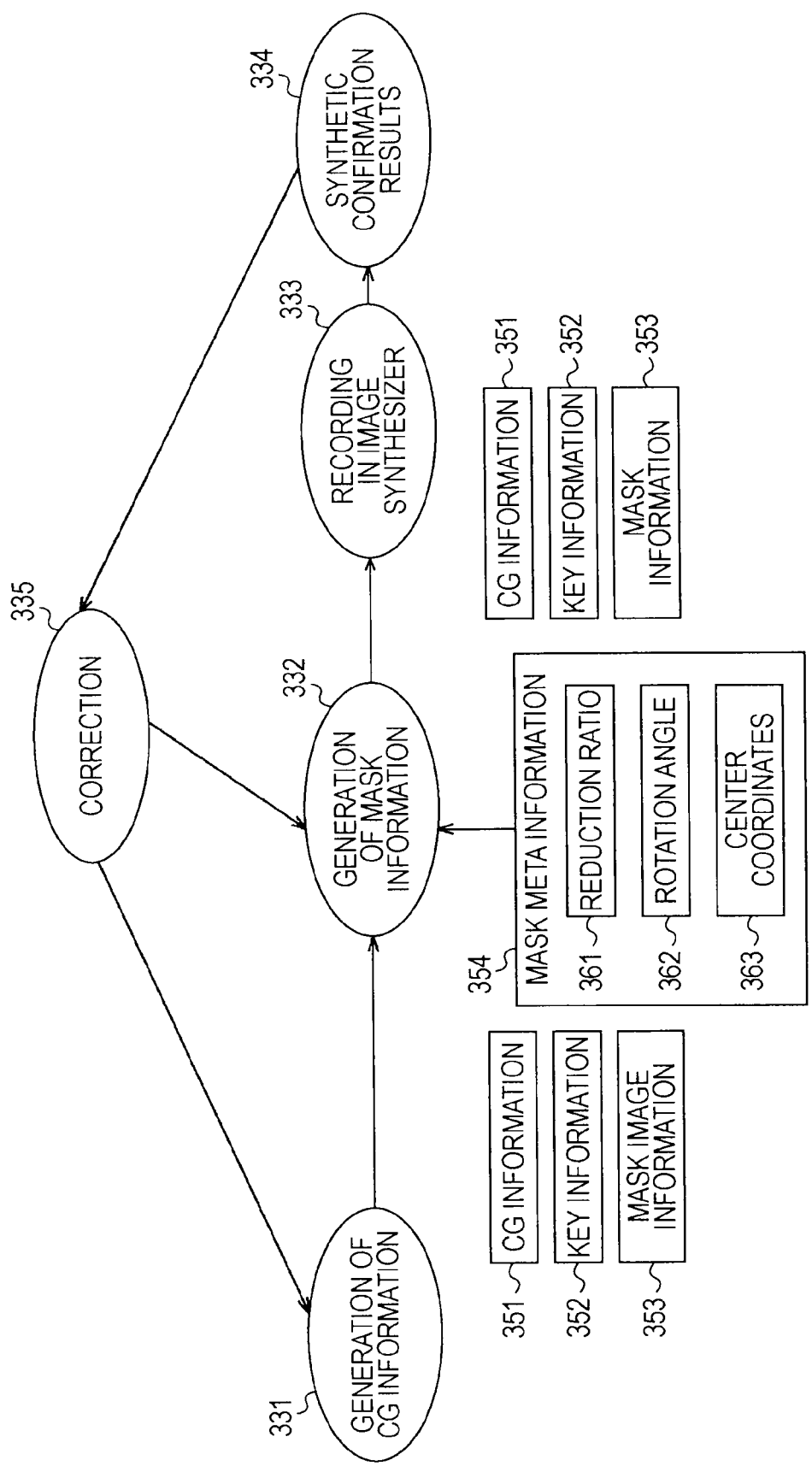

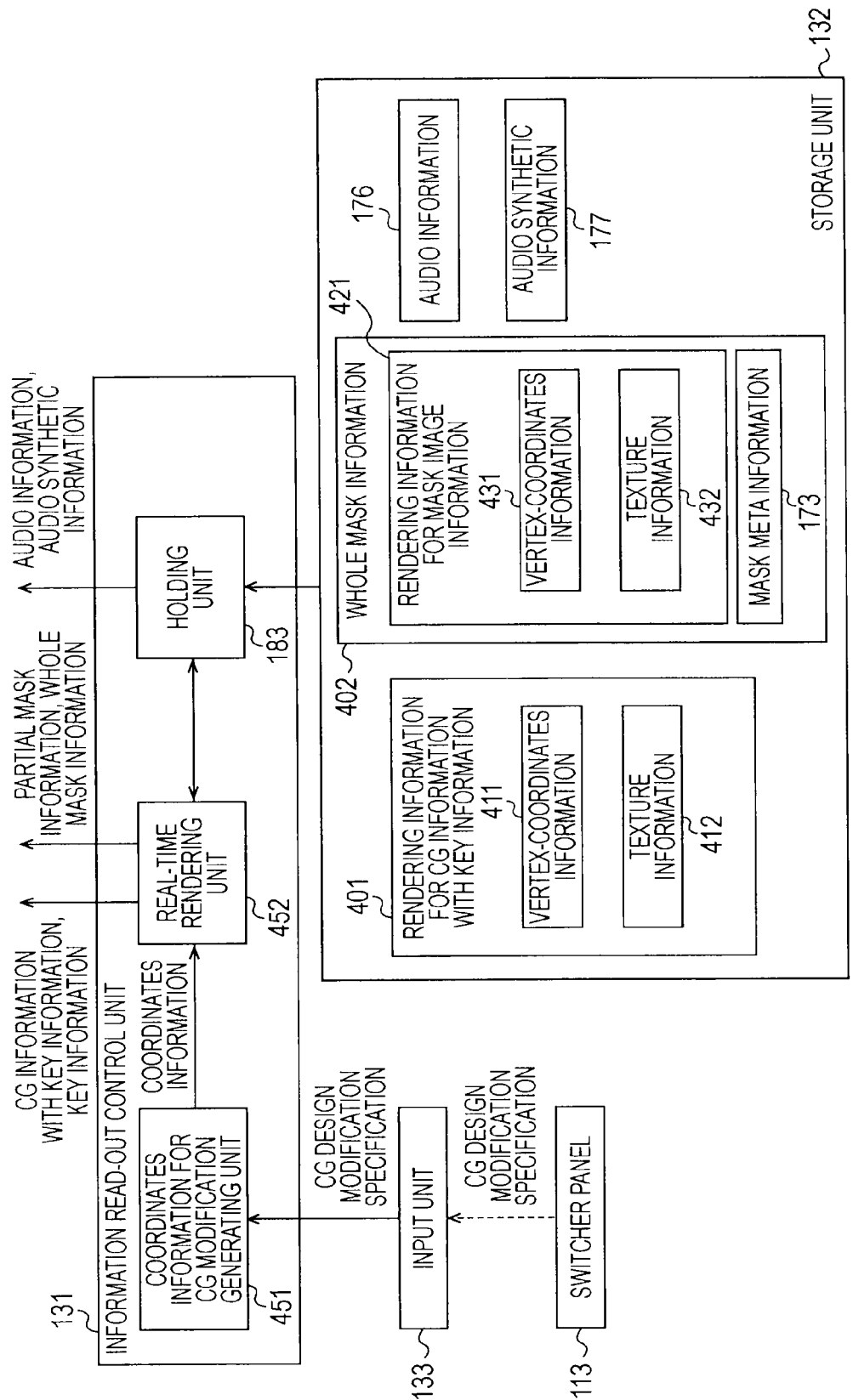

DIVISION LEVEL = 3
(H : HIGH FREQUENCY,
L : LOW FREQUENCY)

IMAGE INPUT

WAVELET TRANSFORM RESULTS (ANALYSIS)

IMAGE OUTPUT

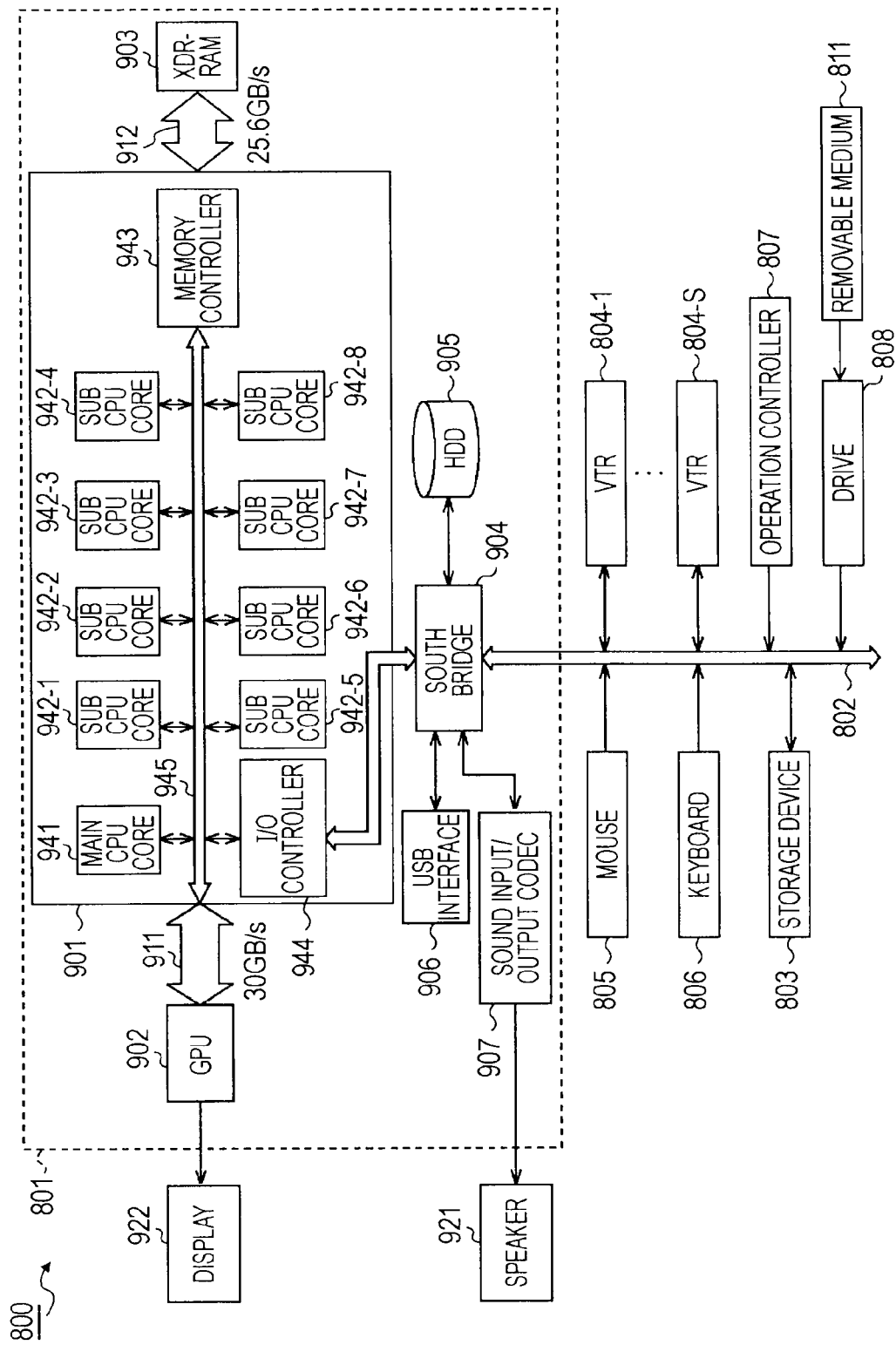

INFORMATION PROCESSING DEVICE AND METHOD, AND PROGRAM

BACKGROUND OF THE INVENTION

1. Field of the Invention

The present invention relates to an information processing device and method, and program, and specifically, relates to an information processing device and method, and program, whereby more complicated image synthetic processing can be performed with less delay.

2. Description of the Related Art

Heretofore, there have been various types of image processing (e.g., Japanese Patent Nos. 3117097 and 3503168). For example, Japanese Patent No. 3117097 discloses a method for mapping an input image in three-dimensional shape such as a polygonal column or the like. Japanese Patent No. 3503168 discloses a method for applying special effects such as enlargement, reduction, shift, deformation, or the like, to an image. Also, there have been conceived various types of image processing employing multiple images (e.g., Japanese Patent Nos. 3480648, 3700871, and 4003508). Japanese Patent Nos. 3503168, 3480648, and 4003508 have disclosed a so-called picture-in-picture method for displaying two images in a state in which one image is fitted into a portion of the other image. Also, Japanese Patent No. 3700871 has disclosed a ratio control method for mixing two images.

SUMMARY OF THE INVENTION

However, the above literature does not describe a more complicated image processing method, such as a partial image to be fitted into a frame surrounded with a free form curve being clipped from each of a great number of (multi-system) input images, and an output image is generated, for example, by subjecting the clipped image to processing such as reduction or the like, combining the clipped images with each other, or superimposing a CG (Computer Graphics) image or further another image upon the clipped image.

Heretofore, recorded and saved image data has been subjected to such more complicated image processing (in an off-line state), but in recent years, with so-called live broadcasting as well, wherein an image is broadcasted in a real-time manner, for example, such as live sports broadcasting, such complicated image processing has been requested. That is to say, there is demand to perform more complicated image processing with shorter delay.

However, with a method using editing processing in an off-line state according to the related art, image data has to be stored, so it may be difficult to meet such demand.

Also, with the devices disclosed in Japanese Patent Nos. 3503168, 3480648, and 4003508, and a so-called switcher device, only simple synthetic processing is performed such that another image is embedded in a rectangular region of a part of an image. The device disclosed in Japanese Patent No. 3700871 only controls a mixture ratio between two images to be superimposed. Accordingly, it has been difficult to realize more complicated image processing as described above.

Further, it can also be conceived to combine the methods disclosed in Japanese Patent Nos. 3117097, 3503168, 3480648, 3700871, and 4003508, but in this case, the number of stages of image processing increases, so delay due to the image processing also increases. Accordingly, realizing more complicated image processing with live broadcasting has been considered to be difficult with the related art.

There has been realized demand to provide a method enabling more complicated image synthetic processing with less delay to be performed.

According to an embodiment of the present invention, an information processing device includes: a clipping unit configured to subject a plurality of images to clipping processing for clipping a part of an image as a partial image to clip a partial image from each of the plurality of images; a size correcting unit configured to correct an image size regarding each of a plurality of the partial images clipped by the clipping unit; and a synthesizing unit configured to connect the partial images of which the image sizes have been corrected by the size correcting unit to generate a synthetic image.

The clipping unit may perform clipping of the partial image by a clipping method specified with first control information, with the size correcting unit correcting the partial image so as to have an image size specified with the first control information, and with the synthesizing unit connecting the partial images by a connecting method specified with the first control information.

The information processing device may further include a CG information synthesizing unit configured to superimpose CG (Computer Graphics) information on the synthetic image generated by the synthesizing unit in accordance with a superimposing method specified with second control information for specifying a connecting method of a plurality of images.

The information processing device may further include: a storage unit configured to store the first control information and the second control information; and a read-out unit configured to read out the first control information and the second control information by the storage unit to supply the first control information to the clipping unit, the size correcting unit, and the synthesizing unit, and supply the second control information to the CG information synthesizing unit.

The read-out unit may generate partial control information which is control information as to each of the plurality of images from the first control information read out from the storage unit to supply a plurality of generated partial control information to the clipping unit and the size correcting unit, with the clipping unit performing clipping of the partial image by a clipping method specified with partial control information corresponding to each image as to each image, and with the size correcting unit correcting each partial image so as to have an image size specified with partial control information corresponding to each partial image.

The first control information and the second control information stored in the storage unit may be compressed with predetermined methods, respectively, with the read-out unit decoding the first control information and the second control information read out from the storage unit by methods corresponding to the compression methods, and then supplying the first control information and the second control information.

The storage unit may manage the first control information and the second control information for each synthetic pattern, with the read-out unit reading out the first control information and the second control information having a specified synthetic pattern from the storage unit, and then supplying the first control information and the second control information.

The information processing device may further include a progress control instructions accepting unit configured to accept a progress control instruction for controlling progress of the synthetic pattern, with the read-out unit determining a position to be processed with the synthetic pattern based on the progress control instruction accepted by the progress control instructions accepting unit, and reading out the first control information and the second control information corresponding to the position to be processed, and then supplying the first control information and the second control information.

The information processing device may further include a modification instructions accepting unit configured to accept a modification instruction having the configuration of the CG information, with the read-out unit updating the first control information and the second control information based on the modification instruction accepted by the modification instructions accepting unit.

The information processing device may further include a preprocessing unit configured to subject the plurality of images to preprocessing, with the clipping unit clipping the partial image from the plurality of images subjected to the preprocessing by the preprocessing unit.

The preprocessing unit may convert the plurality of images of the interlace form into those of the progressive form.

The preprocessing unit may detect a face image from each of the plurality of images, to determine the center coordinates of the partial image clipped by the clipping unit.

According to an embodiment of the present invention, an information processing method for an information processing device, includes the steps of: subjecting a plurality of images to clipping processing for clipping a part of an image as a partial image to clip a partial image from each of the plurality of images; correcting an image size regarding each of a plurality of the clipped partial images; and connecting the partial images of which the image sizes have been corrected to generate a synthetic image.

According to an embodiment of the present invention, a program causes a computer for processing information to perform the steps of: subjecting a plurality of images to clipping processing for clipping a part of an image as a partial image to clip a partial image from each of the plurality of images; correcting an image size regarding each of a plurality of the clipped partial images; and connecting the partial images of which the image sizes have been corrected to generate a synthetic image.

With the above configuration, a plurality of images are subjected to clipping processing for clipping a part of an image as a partial image to clip a partial image from each of the plurality of images, an image size is corrected regarding each of a plurality of the clipped partial images, and the partial images of which the image sizes have been corrected are connected to generate a synthetic image.

According to an embodiment the present invention, images can be processed. Specifically, more complicated image synthetic processing can be performed with less delay.

BRIEF DESCRIPTION OF THE DRAWINGS

FIG. 10 is a flowchart describing another example of the flow of the image synthetic processing;

FIG. 11 is a diagram describing an example of a control information creation workflow;

FIG. 13 is a block diagram illustrating another configuration example of the information read-out control unit;

FIG. 23 is a block diagram illustrating a configuration example of an information processing system to which an embodiment of the present invention has been applied.

DESCRIPTION OF THE PREFERRED EMBODIMENTS

Figure 1:
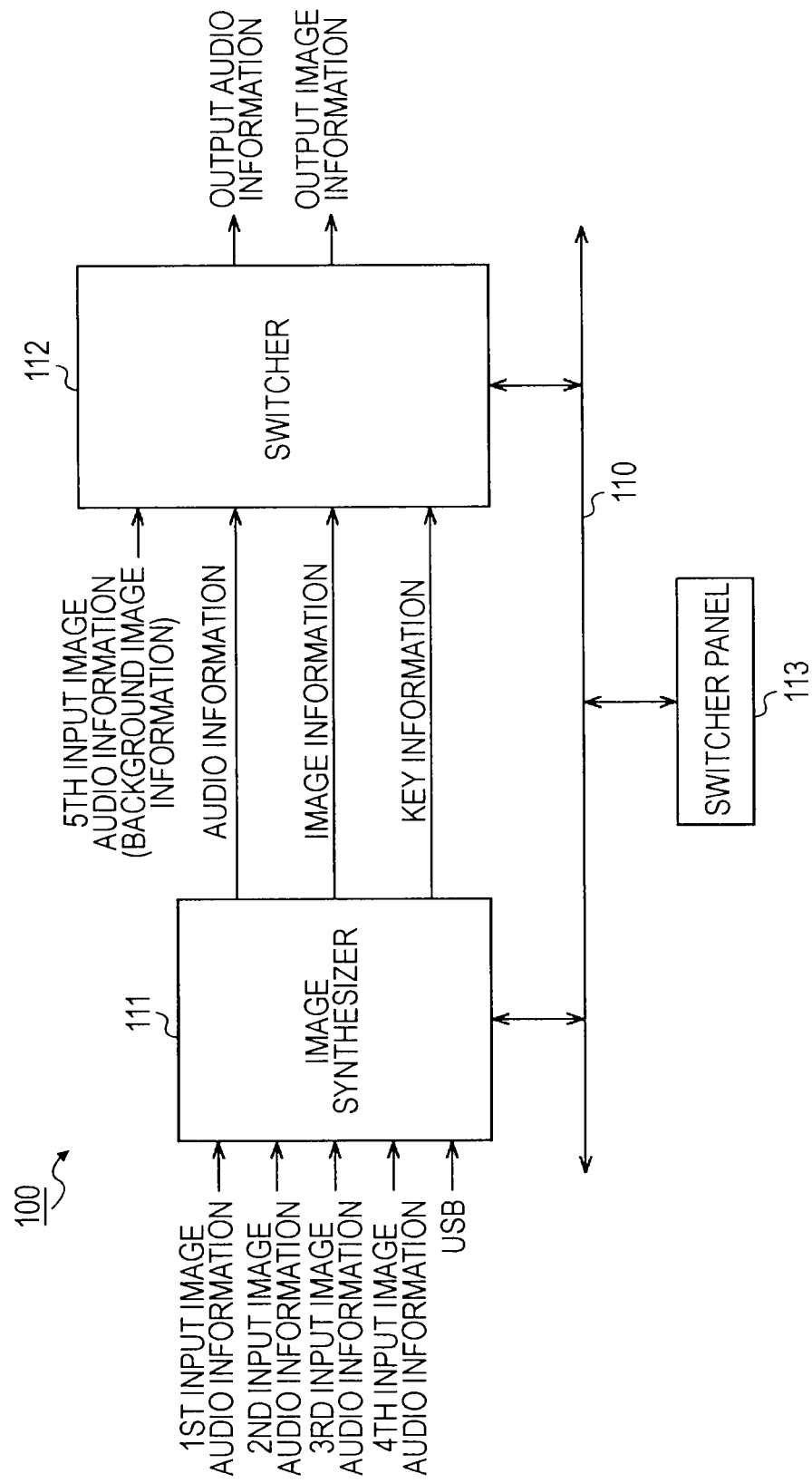
FIG. 1 is a block diagram illustrating a configuration example of an image processing system to which an embodiment of the present invention has been applied.

FIG. 1 is a block diagram illustrating a configuration example of an image processing system to which an embodiment of the present invention has been applied. In FIG. 1, an image processing system 100 is a system which performs more complicated image synthetic processing with less delay, and are mutually connected with an image synthesizing device 111, switcher 112, and switcher panel 113 through a network 110 typified by, for example, the Internet.

The image synthesizing device 111 is a device which performs more complicated image synthetic processing with less delay. Image audio information made up of image information and audio information (first input image audio information through fourth input image audio information) is input to each of multiple input systems of the image synthesizing device 111. The image synthesizing device 111 clips a partial image within a frame created with a free form curve (arbitrary curve) from the image information of each piece of the input image audio information in accordance with control information to reduce (or enlarge) this to a predetermined size. The image synthesizing device 111 combines these partial images mutually to create a synthetic image, and supplies the synthetic image thereof to the switcher 112 through a predetermined dedicated cable or the like as image information. The image synthesizing device 111 also supplies, other than the image information, information corresponding to the image information thereof (e.g., audio information, or key information which is control information for image synthesis at the switcher 112) to the switcher 112 through a predetermined dedicated cable or the like.

The switcher 112 takes the image of fifth input image audio information as a background image, and superimposes the image (synthetic image) supplied from the image synthesizing device 111 thereupon in accordance with the key information. The switcher 112 outputs the synthesis results as output image information and output audio information.

Note that the number of the input systems of the image synthesizing device 111 may be any number as long as the number is two or more. Also, the number of output systems is also optional. Similarly, the number of the input systems of the switcher 112 may be any number as long as the number is two or more, and the number of output systems is also optional. Description will be made below regarding a case where the image synthesizing device 111 includes four input systems and one output system, and the switcher 112 includes two input systems and one output system, for convenience of explanation. Also, the image synthesizing device 111 and switcher 112 may input or output information other than the above-mentioned information corresponding to the image information.

The switcher panel 113 is a user interface device including a switch, lever, and so forth, and accepts an instruction from the user, for example, such as a synthetic pattern specification, synthetic start instruction, or the like, and supplies the information thereof to the image synthesizing device 111 or switcher 112. The image synthesizing device 111 or switcher 112 performs various types of processing based on the user instruction thereof.

Figure 2:
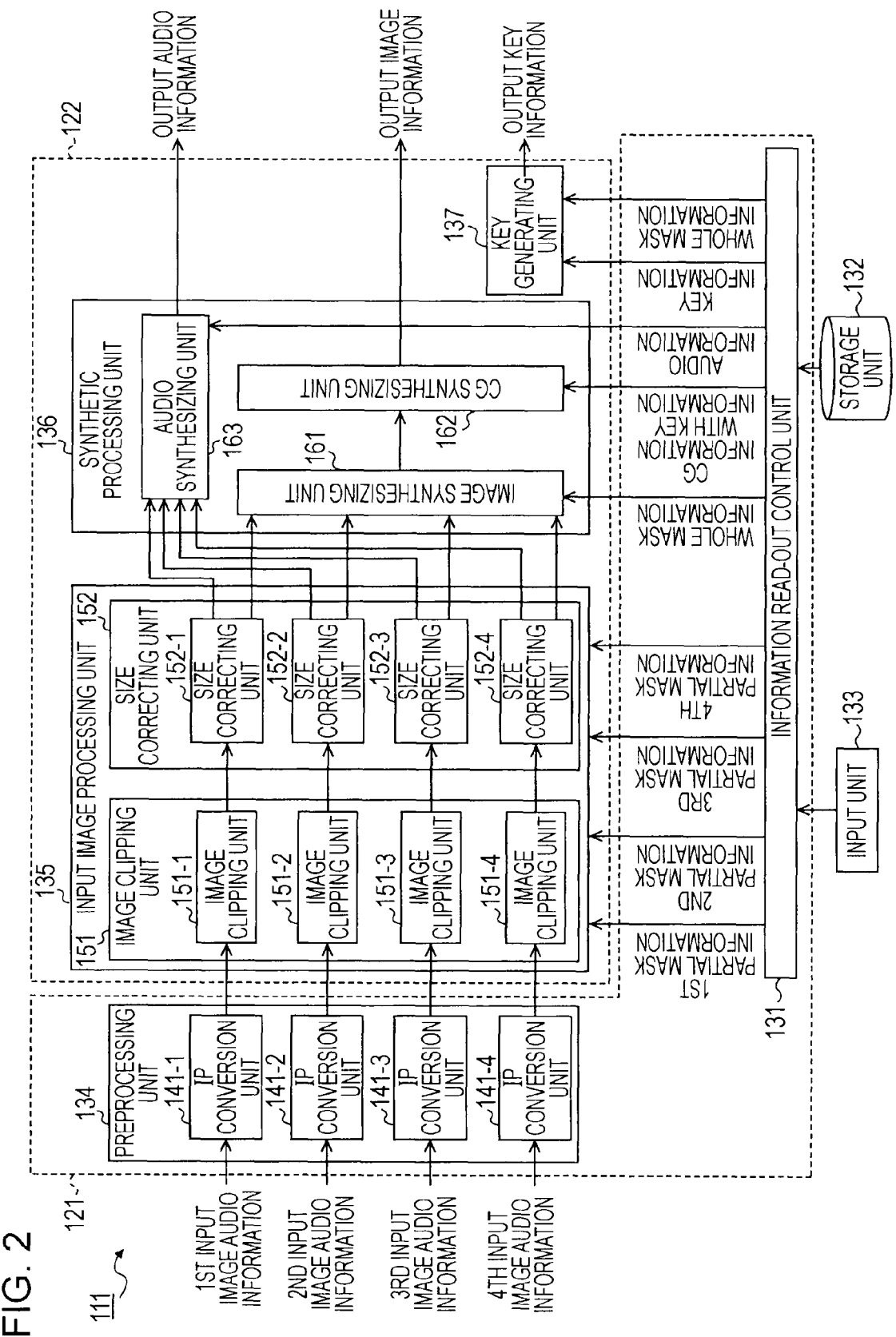
FIG. 2 is a block diagram illustrating a principal configuration example of an image synthesizing device to which an embodiment of the present invention has been applied.

FIG. 2 is a block diagram illustrating a principal configuration example of the image synthesizing device 111 to which an embodiment of the present invention has been applied. The image synthesizing device 111 shown in FIG. 2 is a device making up the image processing system 100 in FIG. 1, and as shown in FIG. 2, includes an information read-out control unit 131, storage unit 132, input unit 133, preprocessing unit 134, input image processing unit 135, synthetic processing unit 136, and key generating unit 137.

The information read-out control unit 131 reads out the information stored in the storage unit 132 to process this, and supplies predetermined information to the input image processing unit 135, synthetic processing unit 136, or key generating unit 137 at predetermined timing. For example, the information read-out control unit 131 supplies first partial mask information through fourth partial mask information to image clipping units 151-1 through 151-4, and size correcting units 152-1 through 152-4, of the input image processing unit 135. Also, for example, the information read-out control unit 131 supplies whole mask information to an image synthesizing unit 161 of the synthetic processing unit 136. Further, the information read-out control unit 131 supplies, for example, CG (Computer Graphics) information with key information to a CG synthesizing unit 162 of the synthetic processing unit 136. Also, the information read-out control unit 131 supplies, for example, audio information or audio synthetic information to an audio synthesizing unit 163 of the synthetic processing unit 136. Further, for example, the information read-out control unit 131 supplies the key information and whole mask information to the key generating unit 137. Each information will be described later.

The storage unit 132 includes, for example, a storage medium such as a hard disk, flash memory, or the like, and stores control information relating to synthetic processing beforehand. The input unit 133 includes, for example, a user interface such as a switch, button, and so forth, a network interface connected to the network 110, and so forth. The input unit 133 accepts information supplied from another device connected thereto, for example, through the user's input or network 110 to supply this to the information read-out control unit 131.

The preprocessing unit 134 subjects the input image of each input system to appropriate processing before synthesis.

The preprocessing unit 134 includes IP conversion units 141-1 through 141-4. The IP conversion unit 141-1, when the image information of the first input image audio information conforms to the interlace form, converts this into the progressive form (performs the IP conversion). Similarly, the IP conversion unit 141-2 subjects the image information of the second input image audio information to the IP conversion, the IP conversion unit 141-3 subjects the image information of the third input image audio information to the IP conversion, and the IP conversion unit 141-4 subjects the image information of the fourth input image audio information to the IP conversion.

Each of the input image audio information subjected to IP conversion processing is supplied to the input image processing unit 135. That is to say, the image information of the first input image audio information through fourth input image audio information to be input to the input image processing unit 135 conform to the progressive form. Note that, in a case where the input image of the preprocessing unit conforms to the progressive form, this IP conversion processing is omitted.

The IP conversion is performed at the preprocessing as described above, and accordingly, each process performed as to the image information at the input image processing unit 135, synthetic processing unit 136, and key generating unit 137 is performed in frame. Note that an arrangement may be made wherein the input image conforming to the interlace form is not subjected to the IP conversion, and is subjected to each process at the input image processing unit 135, synthetic processing unit 136, and key generating unit 137 for each field. Hereinafter, in a case where frames and fields do not have to be distinguished, these will be referred to as pictures collectively. That is to say, each process at the input image processing unit 135, synthetic processing unit 136, and key generating unit 137 is performed in increments of pictures (frames or fields).

The input image processing unit 135 includes an image clipping unit 151 and size correcting unit 152. The image clipping unit 151 clips a portion specified with mask information from the input image information. The image clipping unit 151 includes image clipping units 151-1 through 151-4.

The image clipping unit 151-1 clips a range specified with the first partial mask information supplied from the information read-out control unit 131 from each picture of the image information of the first input image audio information, and supplies the clipped partial image thereof to the size correcting unit 152-1. The image clipping unit 151-2 clips a range specified with the second partial mask information supplied from the information read-out control unit 131 from each picture of the image information of the second input image audio information, and supplies the clipped partial image thereof to the size correcting unit 152-2. The image clipping unit 151-3 clips a range specified with the third partial mask information supplied from the information read-out control unit 131 from each picture of the image information of the third input image audio information, and supplies the clipped partial image thereof to the size correcting unit 152-3. The image clipping unit 151-4 clips a range specified with the fourth partial mask information supplied from the information read-out control unit 131 from each picture of the image information of the fourth input image audio information, and supplies the clipped partial image thereof to the size correcting unit 152-4.

The size correcting unit 152 corrects the image size of the partial image clipped at the image clipping unit 151. More specifically, the size correcting unit 152 corrects (reduces or enlarges) the image size of each partial image such that the image size of the synthetic image made up of connected partial images becomes a predetermined size.

The size correcting unit 152 includes the size correcting units 152-1 through 152-4. The size correcting unit 152-1 corrects the image size of a partial image clipped at the image clipping unit 151-1 with a reduction ratio (or enlargement ratio) specified with the first partial mask information supplied from the information read-out control unit 131. The size correcting unit 152-2 corrects the image size of a partial image clipped at the image clipping unit 151-2 with a reduction ratio (or enlargement ratio) specified with the second partial mask information supplied from the information read-out control unit 131. The size correcting unit 152-3 corrects the image size of a partial image clipped at the image clipping unit 151-3 with a reduction ratio (or enlargement ratio) specified with the third partial mask information supplied from the information read-out control unit 131. The size correcting unit 152-4 corrects the image size of a partial image clipped at the image clipping unit 151-4 with a reduction ratio (or enlargement ratio) specified with the fourth partial mask information supplied from the information read-out control unit 131.

The size correcting unit 152-1 supplies the partial image subjected to the size correction to the image synthesizing unit 161 of the synthetic processing unit 136. Also, the size correcting unit 152-1 supplies the audio information of the first input image audio information (the audio information of the portion corresponding to the picture to be processed) to the audio synthesizing unit 163. Similarly, the size correcting unit 152-2 supplies the partial image subjected to the size correction to the image synthesizing unit 161 of the synthetic processing unit 136, and supplies the audio information of the second input image audio information (the audio information of the portion corresponding to the picture to be processed) to the audio synthesizing unit 163.

The size correcting unit 152-3 similarly supplies the partial image subjected to the size correction to the image synthesizing unit 161 of the synthetic processing unit 136, and supplies the audio information of the third input image audio information (the audio information of the portion corresponding to the picture to be processed) to the audio synthesizing unit 163. The size correcting unit 152-4 similarly supplies the partial image subjected to the size correction to the image synthesizing unit 161 of the synthetic processing unit 136, and supplies the audio information of the fourth input image audio information (the audio information of the portion corresponding to the picture to be processed) to the audio synthesizing unit 163.

The synthetic processing unit 136 performs synthetic processing of images and audio. The synthetic processing unit 136 includes the image synthesizing unit 161, CG synthesizing unit 162, and audio synthesizing unit 163. The image synthesizing unit 161 connects the partial images supplied from the size correcting units 152-1 through 152-4 in accordance with the whole mask information supplied from the information read-out control unit 131 to generate a synthetic image, and supplies this to the CG synthesizing unit 162. The CG synthesizing unit 162 superimposes the CG information with key information supplied from the information read-out control unit 131 on the synthetic image supplied from the image synthesizing unit 161, and outputs the synthetic image thereof as output image information. The audio synthesizing unit 163 synthesizes or selects the audio information supplied from the size correcting units 152-1 through 152-4, and the audio information supplied from the information read-out control unit 131 based on the audio synthetic information supplied from the information read-out control unit 131 to generate output audio information, and outputs this.

The key generating unit 137 updates the key information supplied from the information read-out control unit 131 in accordance with the whole mask information supplied from the information read-out control unit 131, and generates key information for output, i.e., key information corresponding to output image information, and outputs this.

As described with reference to FIG. 1, the output audio information, output image information, and output key information output from the image synthesizing device 111 are supplied to the switcher 112 through dedicated cables or the like, respectively.

Figure 3:
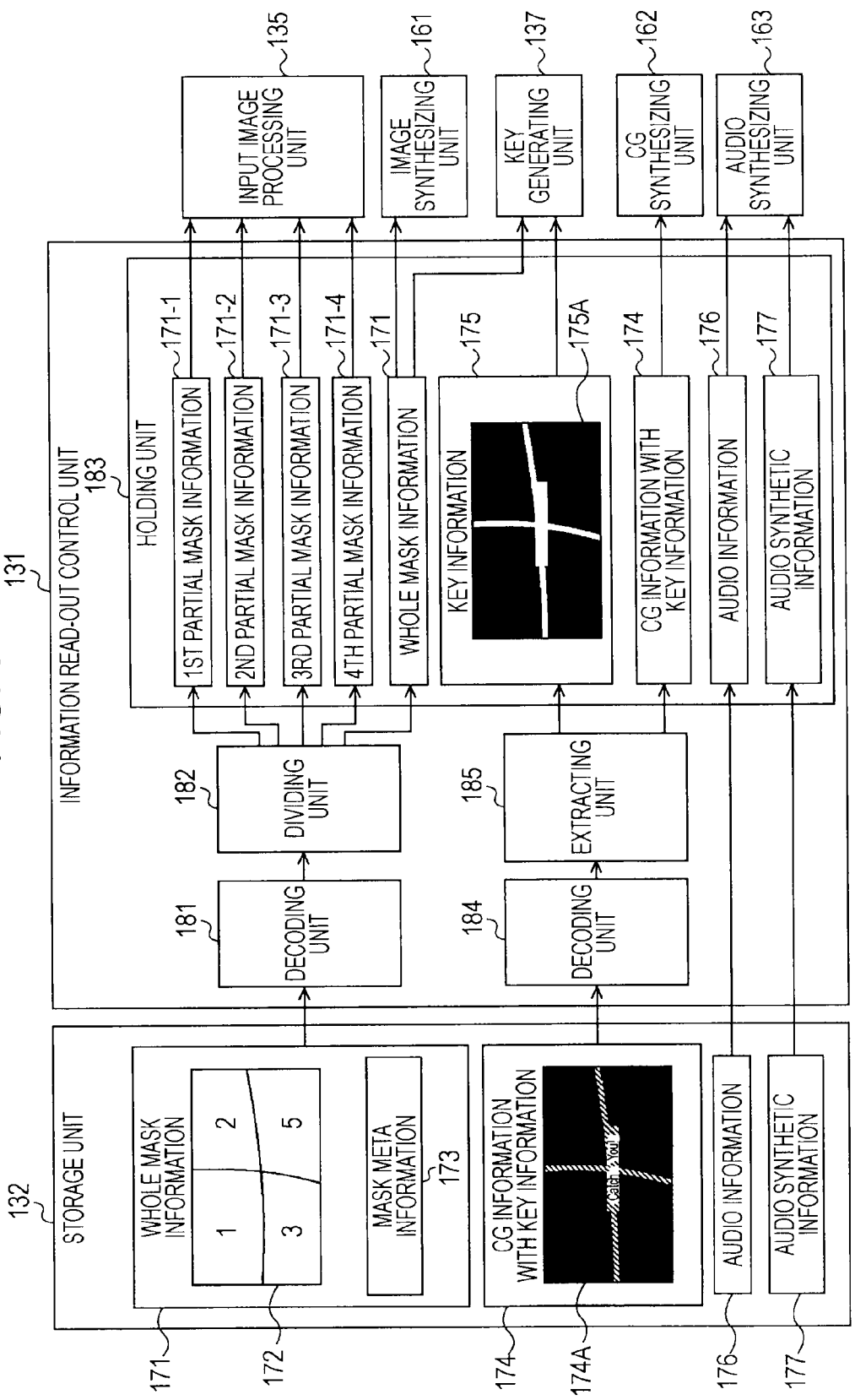
FIG. 3 is a diagram describing control information.

Next, each information will be described. First, control information will be described with reference to FIG. 3. As shown in FIG. 3, whole mask information 171, CG information with key information 174, audio information 176, and audio synthetic information 177 are stored in the storage unit 132 of the image synthesizing device 111 beforehand.

The mask information is control information indicating a synthetic method such as a clipping method, connecting method, or the like. The whole mask information 171 is mask information indicating a synthesizing method regarding the entire image (entire picture). As shown in FIG. 3, the whole mask information 171 includes mask image information 172 and mask meta information 173.

The mask image information 172 is information indicating the structure of a synthetic image which is a synthesized result. That is to say, the mask image information 172 specifies whether to select the image of which input system as a synthesized result regarding all of the pixels of a synthetic image. In other words, the mask image information 172 specifies the shapes of partial images, and the connection method of clipped partial images. This specification is performed in increments of pixels, and the mask image information 172 is structured as bitmap information.

FIG. 3 schematically illustrates the situation (bitmap) of the specification thereof. In the case of the example in FIG. 3, the whole image is divided into four regions, wherein a value specifying the partial image of the first input image audio information (e.g., "1") is assigned to the respective pixels within the upper left region (region of "1"), a value specifying the partial image of the second input image audio information (e.g., "2") is assigned to the respective pixels within the upper right region (region of "2"), and a value specifying the partial image of the third input image audio information (e.g., "3") is assigned to the respective pixels within the lower left region (region of "3"). These values may be numerical characters, or may be text characters or symbols or the like. Note that another image is to be superimposed on the lower right region (region of "5") at another device, and a value (e.g., "5") indicating specifying no partial image is assigned to the respective pixels of this region. This value may be a numerical character, or may be a text character or symbol or the like.

Such a specification is performed in increments of pixels, whereby the mask image information 172 can readily be specified so as to clip a partial image having an arbitrary shape, and can also readily be specified with a method for connecting complicated-shaped partial images. For example, the mask image information 172 can readily be specified so as to set the boundary line of a region serving as a clipping frame to a free form curve (arbitrary curve), and can also readily be specified with a method for connecting partial images clipped in the free form curve shape thereof.

The mask meta information 173 is additional information of the mask image information 172, and includes information which is not indicated with the mask image information 172, for example, such as the central angle, rotation angle, reduction ratio, and so forth, of clipping.

The whole mask information 171 is stored in the storage unit 132 beforehand, but for the sake of effective use of the storage region of the storage unit 132 (region securing), or effective use of bus band at the time of read-out (band securing), the whole mask information 171 is compressed with a predetermined method and stored in a state in which the information quantity is reduced. The compression method is arbitrary, and is compressed with the run length coding, for example.

The information read-out control unit 131 includes, as shown in FIG. 3, a decoding unit 181, dividing unit 182, and holding unit 183. Upon reading out the whole mask information 171 from the storage unit 132, the information read-out control unit 131 decodes this at the decoding unit 181, and generates mask information for each input system at the dividing unit 182. First partial mask information 171-1 is mask information (partial mask information) as to the first input system, generated by only information relating to the first input image audio information being extracted from the whole mask information 171. Second partial mask information 171-2 is mask information (partial mask information) as to the second input system, generated by only information relating to the second input image audio information being extracted from the whole mask information 171. Third partial mask information 171-3 is mask information (partial mask information) as to the third input system, generated by only information relating to the third input image audio information being extracted from the whole mask information 171. Fourth partial mask information 171-4 is mask information (partial mask information) as to the fourth input system, generated by only information relating to the fourth input image audio information being extracted from the whole mask information 171.

The dividing unit 182 causes the holding unit 183 including a storage region such as RAM (Random Access Memory) or the like to hold the generated first partial mask information 171-1 through fourth partial mask information 171-4, and the whole mask information before dividing.

The information read-out control unit 131 supplies the first partial mask information 171-1 through fourth partial mask information 171-4 to the corresponding input systems of the input image processing unit 135 at predetermined timing, respectively. Thus, only appropriate information is supplied to each input system, so the image clipping unit 151 and size correcting unit 152 do not have to handle unnecessary control information, thereby enabling each process to be performed effectively. Also, with the storage unit 132, such partial mask information is stored as the single whole mask information 171, whereby information quantity can be reduced, for example, such as omitting of redundant information, or the like. Also, the partial mask information is stored as the single whole mask information 171, whereby processing throughput can be improved such as reduction in the number of times of read-out processing and decoding processing.

Also, the information read-out control unit 131 supplies the whole mask information held at the holding unit 183 to the image synthesizing unit 161 and key generating unit 137 at predetermined timing, respectively.

The CG information with key information 174 is information wherein key information which is control information employed when superimposing one image on another image is added to CG information which is image information. The CG information is bitmap of three colors, such as RGB or the like. The key information is bitmap of one color (grayscale) for specifying whether to superimpose (synthesize) another image on which portion, in increments of pixels. The key information is common control information which can be employed at the switcher 112.

An image 174A in FIG. 3 schematically represents this CG information with key information 174, wherein the solid portion is the key information, and the other shaded pattern portion (including the text of "Catch You!") is the CG information.

The CG information with key information 174 is also stored in the storage unit 132 beforehand, but for the sake of effective use of the storage region of the storage unit 132 (region securing), or effective use of bus band at the time of read-out (band securing), the CG information with key information 174 is compressed with a predetermined method and stored in a state in which the information quantity is reduced. For example, the CG information with key information 174 is converted into a YCbCrA signal of 4:2:2:4, and is then compressed. This compression method is optional.

The information read-out control unit 131 includes, as shown in FIG. 3, a decoding unit 184, and extracting unit 185. Upon reading out the CG information with key information 174 from the storage unit 132, the information read-out control unit 131 decodes this at the decoding unit 184, and extracts the key information 175 from the CG information with key information 174 at the extracting unit 185. An image 175A schematically illustrates the key information 175. As can be understood as compared to the image 174A, a solid portion (i.e., key information) alone is extracted.

The extracting unit 185 causes the holding unit 183 to hold the extracted key information 175 and the CG information with key information 174 which is the extraction source.

The information read-out control unit 131 supplies the key information held at the holding unit 183 to the key generating unit 137 at predetermined timing. Also, the information read-out control unit 131 supplies the CG information with key information 174 held at the holding unit 183 to the CG synthesizing unit 162 at predetermined timing.

As described above, the key information 175 alone is extracted from the CG information with key information to supply this to the key generating unit 137, and accordingly, the key generating unit 137 does not have to handle unnecessary control information (CG information), whereby key information for output can be generated effectively. Also, the key information 175 is generated by being extracted from the CG information with key information 174, i.e., the CG information with key information 174 alone is stored in the storage unit 132, whereby the information quantity can be reduced (storage region and bus band can be employed effectively). Also, the processing throughput can be improved by reducing the number of times of read-out processing and decoding processing.

The audio information 176 is audio information which is not included in each of the input image audio information, for example, such as sound effects at the time of superimposing CG information on an input image, or the like. The audio synthetic information 177 is control information for specifying an audio synthesizing method of the audio information of each of the input image audio information. For example, the audio synthetic information 177 includes instruction information such that one of the audio information of the respective input systems is selected, and is further synthesized with the audio information 176, or the like.

Upon reading out the audio information 176 and audio synthetic information 177 from the storage unit 132, the information read-out control unit 131 causes the holding unit 183 to hold these, and supplies the audio information 176 and audio synthetic information 177 to the audio synthesizing unit 163 at predetermined timing.

The control information such as described above is employed at the image synthesizing device 111. Note that such control information is prepared for each synthetic pattern. The synthetic patterns mean synthesizing methods of input images. For example, how to process the input images, how to connect the input images, and how to superimpose what kind of CG information to generate a synthetic image are optional. Also, the length of the synthetic processing performed at the image synthesizing device 111 is arbitrary, and may be applied to a picture, or multiple pictures (a predetermined period). Also, in a case where the synthetic processing is performed over multiple pictures, with all of the pictures from the beginning to the end of the synthetic period thereof, each image may be synthesized with mutually completely the same structure (design), or may be synthesized with a structure changed for each picture. Also, the way of changing thereof is also optional.

Such a difference of synthetic methods will be referred to as a synthetic pattern. Such a difference of synthetic methods is indicated with the difference between the contents of control information for controlling a synthetic method, such as the mask information, CG information with key information, and so forth. Accordingly, such control information is prepared for each synthetic pattern. Also, in a case where the synthetic processing is performed over multiple pictures, and a synthetic pattern of which the structure (design) is changed for each picture (dynamic synthetic pattern) is employed, each of the control information is prepared for each picture (the content of the control information is changed for each picture, whereby the structure (design) of a synthetic image is dynamically changed).

The storage unit 132 collectively manages such a plurality of control information for each synthetic pattern.

Figure 4:
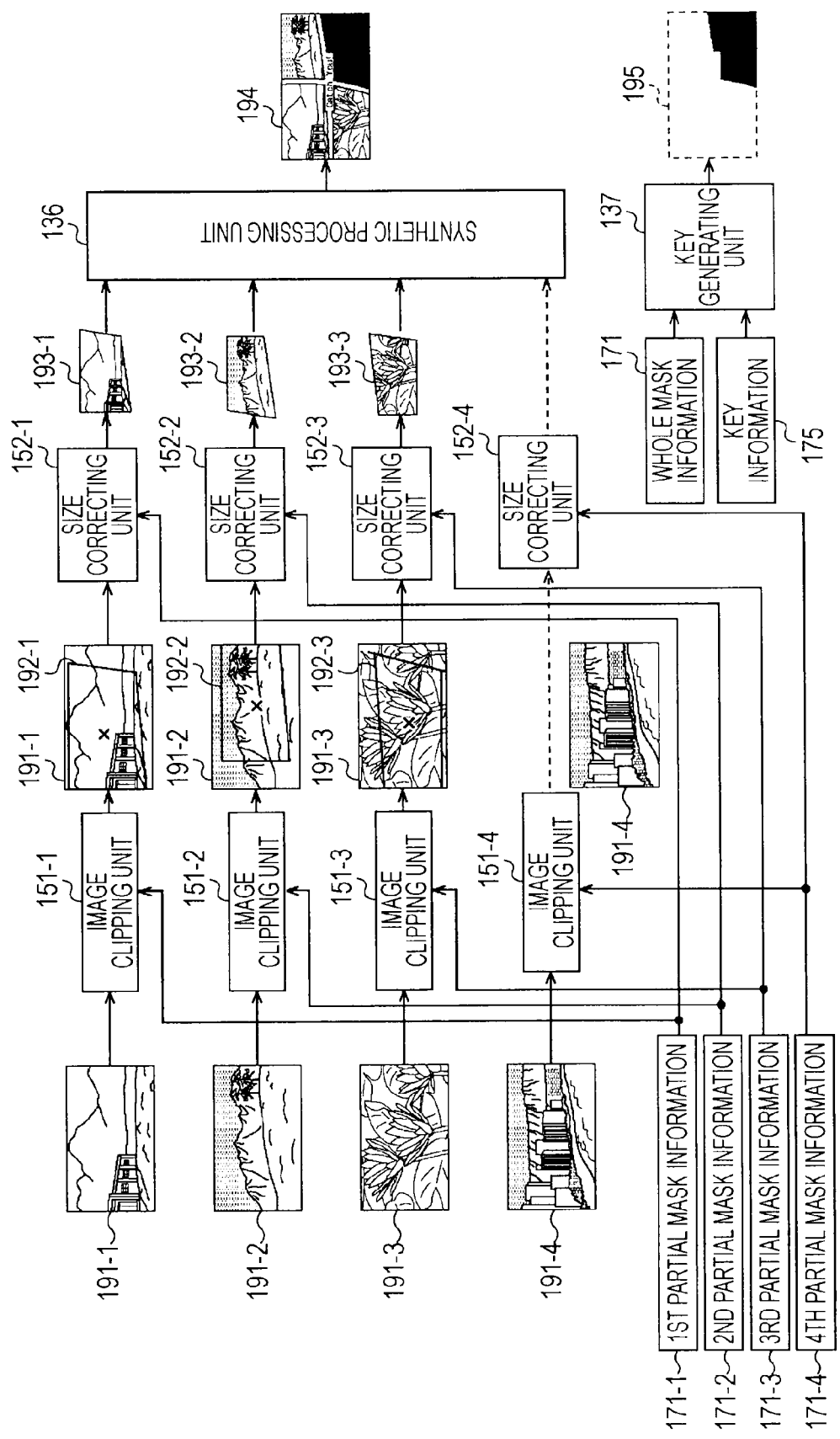
FIG. 4 is a diagram illustrating input image synthesizing.

Next, the way in which images of the respective input systems are synthesized will be described with reference to FIG. 4. In FIG. 4, an image 191-1 indicates the image information of the first input image audio information, an image 191-2 indicates the image information of the second input image audio information, an image 191-3 indicates the image information of the third input image audio information, and an image 191-4 indicates the image information of the fourth input image audio information.

The image clipping unit 151-1 clips a partial image 192-1 from the image 191-1 based on the information included in the first partial mask information 171-1, such as the clipping shape, central coordinates, and so forth. In FIG. 4, a black line within the image 191-1 indicated between the image 191-1 and partial image 192-1 indicates the outline of the partial image 192-1, i.e., a clipping shape, and an x-mark indicates the center point thereof.

The size correcting unit 152-1 corrects (reduces or enlarges) the size of the partial image 192-1 thus clipped based on the information included in the first partial mask information 171-1 to generate an image 193-1. With the example in FIG. 4, the image 193-1 is a reduction image of the partial image 192-1. The image 193-1 is supplied to the synthetic processing unit 136.

The image clipping unit 151-2 clips a partial image 192-2 from the image 191-2 based on the information included in the second partial mask information 171-2, such as the clipping shape, central coordinates, and so forth. The size correcting unit 152-2 corrects (reduces or enlarges) the size of the partial image 192-2 thus clipped based on the information included in the second partial mask information 171-2 to generate an image 193-2. With the example in FIG. 4, the image 193-2 is a reduction image of the partial image 192-2. The image 193-2 is supplied to the synthetic processing unit 136.

The image clipping unit 151-3 clips a partial image 192-3 from the image 191-3 based on the information included in the third partial mask information 171-3, such as the clipping shape, central coordinates, and so forth. The size correcting unit 152-3 corrects (reduces or enlarges) the size of the partial image 192-3 thus clipped based on the information included in the third partial mask information 171-3 to generate an image 193-3. With the example in FIG. 4, the image 193-3 is a reduction image of the partial image 192-3. The image 193-3 is supplied to the synthetic processing unit 136.

The image clipping unit 151-4 also performs clipping of an image from the image 191-4 based on the information included in the fourth partial mask information 171-4, such as the clipping shape, central coordinates, and so forth, but with the example in FIG. 4, the fourth partial mask information 171-4 is not instructed so as to clip a partial image (see the mask image information 172 in FIG. 3). Accordingly, the image clipping unit 151-4 does not generate a partial image, and the size correcting unit 152-4 does not perform size correction, either.

The synthetic processing unit 136 synthesizes the images 193-1 through 193-3 thus supplied, and the CG information with key information supplied from the information read-out control unit 131 to generate a synthetic image 194. This synthetic image 194 is obtained by connecting the images 193-1 through 193-3 as indicated in the mask image information 172 of the whole mask information 171, and further superimposing the CG information with key information thereupon. The portion of the synthetic image 194 that is filled in solid is the key information.

As described above, the synthetic image 194 is generated from input images and so forth based on the control information such as the mask information and so forth. Also, in response to this synthetic processing, the key generating unit 137 generates key information for output 195 from the whole mask 171 and key information 175. The key generating unit 137 removes partial image and CG information portions from the key information 175 based on the whole mask information 171 to generate the key information for output 195. That is to say, the key information 195 corresponds to the synthetic image 194.

An example of the flow of such image synthetic processing will be described with reference to the flowchart in FIG. 5.

Upon the power of the image synthesizing device 111 being turned on, or upon the suspended state thereof being cancelled, the image synthetic processing is started. Upon the image synthetic processing being started, in step S101 the information read-out control unit 131 performs control information read-out processing to read out the control information of all of the synthetic patterns, such as the whole mask information, CG information with key information 174, audio information 176, audio synthetic information 177, and so forth, from the storage unit 132.

In step S102, the information read-out control unit 131 waits until a synthetic start instruction is received. In step S103, when the input unit 133 a synthetic pattern specification or synthetic start instruction input by the user operating the image synthesizing device 111 or supplied from the switcher 113 through the network 110, the information read-out control unit 131 advances the processing to step S104. In step S104, the information read-out control unit 131 supplies the control information of a picture to be processed with the specified synthetic pattern held in the holding unit 183 to the respective units.

In step S105, the preprocessing unit 134 (IP conversion units 141-1 through 141-4) subjects each input image to the IP conversion. In step S106, the image clipping unit 151 (image clipping units 151-1 through 151-4) performs clipping of each input image based on each of the partial mask information. In step S107, the size correcting unit 152 (size correcting units 152-1 through 152-4) performs the size correction of each clipped image (clipped partial image) based on each of the partial mask information.

In step S108, the image synthesizing unit 161 generates a synthetic image by connecting the respective clipped images (clipped partial images) based on the whole mask information 171. In step S109, the CG synthesizing unit 162 synthesizes CG information with key information as to the synthetic image. In step S110, the audio synthesizing unit 163 performs synthesizing of audio information according to the audio synthetic information 177 of the specified synthetic pattern.

In step S111, the key information for output 195 is generated from the key information 175 based on the whole mask information 171 of the specified synthetic pattern.

In step S112, the information read-out control unit 131 determines whether or not all of the pictures of the specified synthetic pattern have been processed, and in a case where determination is made that there is an unprocessed picture, updates the picture to be processed to the next picture, returns the processing to step S104, and executes the processing thereof and thereafter. That is to say, the image synthesizing device 111 repeats the processing in each of the steps S104 through S112 for each picture.

In a case where determination is made in step S112 that all of the pictures of the specified synthetic pattern have been processed, the information read-out control unit 131 advances the processing to step S113, and determines whether to end the image synthetic processing. In a case where determination is made that the image synthetic processing is not ended, the information read-out control unit 131 returns the processing to step S102, and executes the processing thereof and thereafter. Also, in a case where determination is made in step S113 that the image synthetic processing is ended for some reason such as image input being stopped, receiving the user's instructions, or the like, the information read-out control unit 131 ends the image synthetic processing.

Figure 6:
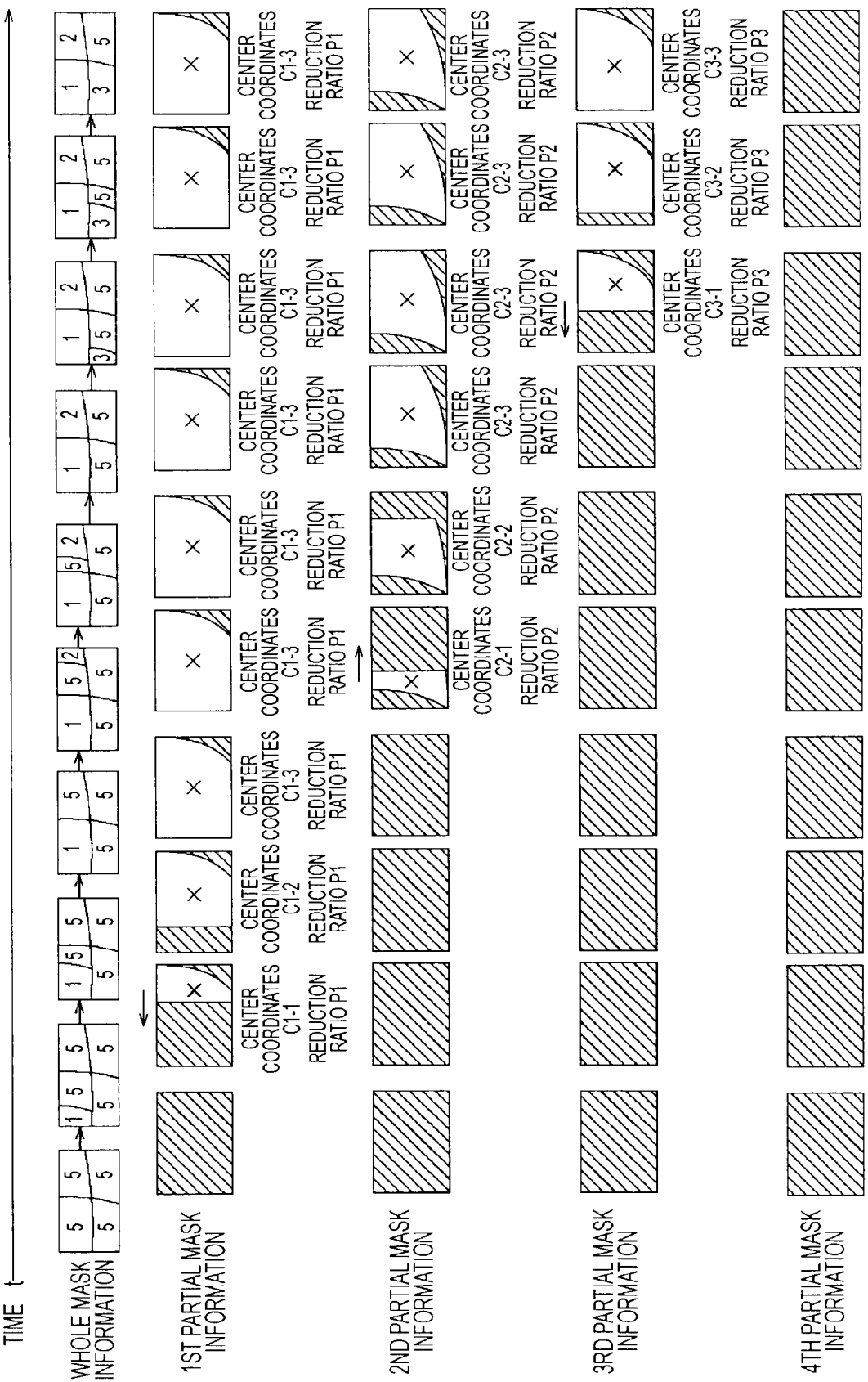
FIG. 6 is a diagram an example of temporal change in mask information.

FIG. 6 illustrates synthetic pattern examples. In FIG. 6, the whole mask information of a certain synthetic pattern, first partial mask information, second partial mask information, third partial mask information, and fourth partial mask information which are generated from the whole mask information, are schematically illustrated sequentially from the top. Note that in FIG. 6, time sequence progresses toward the right from the left.

As shown in the whole mask information, first, a background image is displayed on the whole synthetic image.

As time progresses, the image information of the first input system is gradually inserted on the upper left region of the synthetic image toward the right side from the left side. As time further progresses, the image information of the second input system is gradually inserted on the upper right region of the synthetic image toward the left side from the right side. As time further progresses, the image information of the third input system is gradually inserted on the lower left region of the synthetic image toward the right side from the left side.

With the first partial mask information through fourth partial mask information, a shaded portion is a region not to be extracted as a partial image, and a white portion is a region to be extracted as a partial image. Also, an x-mark indicates the center point of a partial image to be extracted.

First, with the whole mask information, when a background image is assigned to the whole image, there is no partial image clipping instruction with any of the first partial mask information through fourth partial mask information. Subsequently, with the whole mask information, upon the image information of the first input system being inserted gradually toward the right side from the left side, with the first partial mask information, in accordance with the movement thereof, the region to be clipped is widened from the right to the left. Subsequently, with the whole mask information, upon the image information of the second input system being inserted gradually toward the left side from the right side, with the second partial mask information, in accordance with the movement thereof, the region to be clipped is widened from the left to the right. Further subsequently, with the whole mask information, upon the image information of the third input system being inserted gradually toward the right side from the left side, with the third partial mask information, in accordance with the movement thereof, the region to be clipped is widened from the right to the left.

Note that, with the whole mask information, there is no synthetic instruction regarding the fourth system images, so with the fourth partial mask information, there is no clipping instruction.

As described above, each piece of control information is prepared for each picture, so the image synthesizing device 111 can also readily realize a dynamic synthetic pattern such that a synthetic method is changed for each picture.

Figure 7:
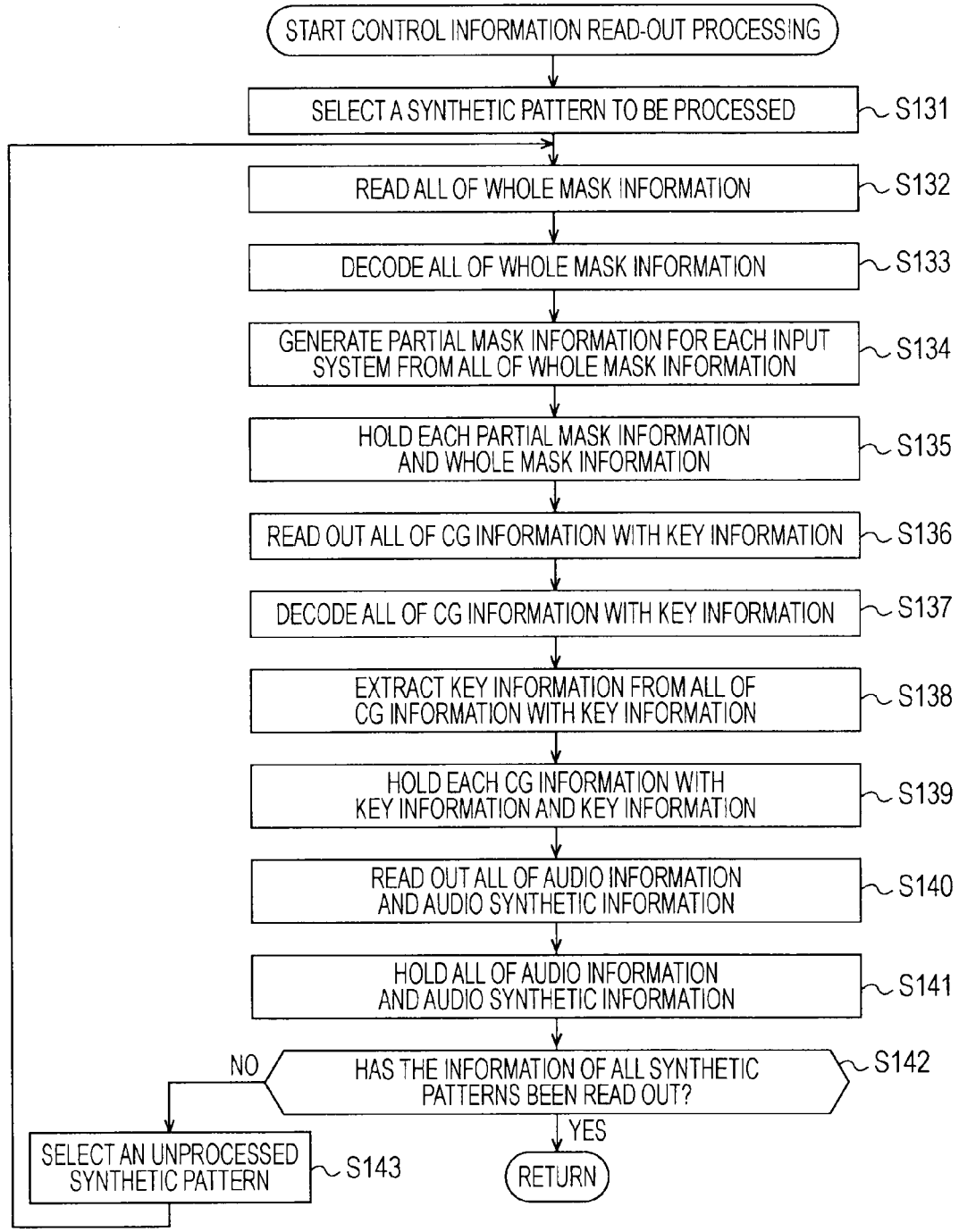
FIG. 7 is a flowchart describing an example of the flow of control information read-out processing.

Next, an example of the flow of the control information read-out processing executed in step S101 in FIG. 5 will be described with reference to the flowchart in FIG. 7.

Upon the control information read-out processing being started, in step S131 the information read-out control unit 131 selects the synthetic pattern to be processed. With the storage unit 132, the control information is managed for each synthetic pattern, so the information read-out control unit 131 reads out the control information for each synthetic pattern.

Upon selecting the synthetic pattern to be processed, in step S132 the information read-out control unit 131 reads out all pieces of the whole mask information 171 of the synthetic pattern to be processed (regarding all of the pictures of the synthetic pattern) from the storage unit 132. In step S133, the decoding unit 181 decodes all pieces of the readout whole mask information 171 by a predetermined method. In step S134, the dividing unit 182 generates partial mask information for each input system from all pieces of the whole mask information 171. In step S135, the holding unit 183 holds each piece of the partial mask information, and all pieces of the whole mask information 171.

In step S136, the information read-out control unit 131 reads out all pieces of the CG information with key information 174 of the synthetic pattern to be processed (all of the pictures of the synthetic pattern) from the storage unit 132. In step S137, the decoding unit 184 decodes all read pieces of the CG information with key information by a predetermined method. In step S138, the extracting unit 185 extracts key information 175 from each of all pieces of the CG information with key information. In step S139, the holding unit 183 holds all pieces of the CG information with key information and key information.

In step S140, the information read-out control unit 131 reads out all pieces of the audio information 176 and audio synthetic information 177 of the synthetic pattern to be processed (regarding all of the pictures of the synthetic pattern) from the storage unit 132. In step S141, the holding unit 183 holds all read pieces of the audio information 176 and audio synthetic information 177.

In step S142, the information read-out control unit 131 determines whether to read out the control information of all of the synthetic patterns has been read out, and in a case where determination is made that there is an unprocessed synthetic pattern, advances the processing to step S143, selects one unprocessed synthetic pattern to take this as the synthetic pattern to be processed. Upon ending the processing in step S143, the information read-out control unit 131 returns the processing to step S132, and repeats the processing thereof and thereafter. That is to say, the processing in each of the steps S132 through S143 is repeatedly executed for each synthetic pattern.

Subsequently, in a case where determination is made that the information of all of the synthetic patterns has been read out, the information read-out control unit 131 ends the information read-out processing, returns the processing to step S101 in FIG. 5, and executes the processing thereof and thereafter.

As described above, all pieces of the control information are read out beforehand, whereby the image synthesizing device 111 can reduce the number of accesses to the storage unit 132 at the time of image synthesis, and accordingly, the synthetic processing throughput can be improved.

As described above, the image synthesizing device 111 performs clipping or size correction of the input image of each input system by employing partial mask information to generate a partial image, and synthesizes these partial images by employing the whole mask information, CG information with key information, audio synthetic information, and so forth. Accordingly, with the image synthesizing device 111, advanced image synthetic processing such as clipping and connecting with a free form curve, or the like, and a complicated synthetic pattern such that the structure thereof is changed dynamically can be realized with few processing stages such as shown in FIG. 2. That is to say, the image synthesizing device 111 can perform more complicated image synthetic processing with less delay.

Description will return to FIG. 1. The user of the image processing system 100 operates a user interface such as a switch or slider or the like of the switcher panel 113 to input various types of control instructions such as an execution start instruction for more complicated image synthetic processing, a synthetic pattern instruction, and so forth, as described above. The switcher 113 supplies the accepted instruction thereof to the image synthesizing device 111 or switcher 112 through the network 110 appropriately. The image synthesizing device 111 accepts the instruction thereof at the input unit 133, and performs the image synthetic processing in accordance with the instruction thereof. Similarly, the switcher 112 also performs synthesis between the fifth input image audio information (background image information), the image information, audio information, and key information supplied from the image synthesizing device 111 based on the user's instruction supplied from the switcher panel 113.

Thus, the image processing system 100 employs the image synthesizing device 111, whereby more complicated synthetic processing can be performed with a smaller number of processing stages as compared to a case where synthetic processing is performed by disposing multiple switchers according to the related art. That is to say, the image processing system 100 can perform more complicated image synthetic processing with less delay.

Such an image processing system 100 is employed for, for example, real-time editing at a so-called live broadcast with a television broadcast or the like. Live broadcasts employ a technique for broadcasting shot images with delay as short as possible, wherein shooting and broadcasting are performed generally at the same time (broadcasted in real time). This technique is employed for, for example, programs broadcasting scenes from various types of sports games such as baseball, soccer, tennis, golf, volleyball, or the like, programs broadcasting scenes from various types of events such as concerts, festivals, or the like, news programs broadcasting scenes of incidents or accidents, and so forth.

However, with a live broadcast, shot images have to be broadcasted with as little delay as possible, so time for performing editing is extremely restricted. Accordingly, with a live broadcast, generally, real-time editing for performing simple editing in real time is performed, such as switching of images, image processing of a predetermined pattern, or the like.

However, with such simple editing, it has been difficult to subject shot images to effective production. For example, with a soccer game, when a goal is scored, this is an exciting moment of the game. Accordingly, with a program for broadcasting a soccer game (a so-called live soccer broadcast) as well, it is desirable to subject shot images to production so as to invoke emotional involvement of the viewer.

Heretofore as well, for example, multiple images, such as a close-up image of a player who has scored or is a player of interest, a scene of a manager or coach at the moment of scoring, or a scene of the crowd, and so forth, have been broadcasted by being integrated into one screen by employing picture-in-picture.

However, such production has to be performed with little delay, so picture-in-picture is no more than overlapping of images having a simple shape such as a square, circle, or the like, and accordingly, it has been difficult to perform more elaborate production, for example, such as clipping of an image with a free form curve, connecting of clipped partial images thereof, synthesizing of complicated CG information, dynamic change in a structure (design), or the like.

As described above, the image processing system 100 (image synthesizing device 111) can perform more complicated image synthetic processing with little delay, for example, such as around several pictures, whereby production having a high visual effect and excellent design nature can be realized by employing such real-time editing. That is to say, for example, with a program for broadcasting a soccer game, real-time editing is performed by employing the image processing system 100 (image synthesizing device 111), whereby highly-attractive production can be performed, for example, immediately after scoring, or the like, and accordingly, shot images can be subjected to production so as to invoke emotional involvement of the viewer.

Note that description has been made so far wherein the image synthesizing device 111 performs the size correction of clipped partial images, but an arrangement may be made wherein instead of this size correction, or in addition to this size correction, another process may be performed, for example, such as rotating a partial image, or the like. For example, an arrangement may be made wherein the information of a rotation angle is registered in the mask meta information 173 of the whole mask information 171, and the input image processing unit 135 rotates the partial image clipped based on the mask meta information 173 thereof in the two-dimensional direction or three-dimensional direction. Thus, the image synthesizing device 111 can generate a synthetic image of which the visual effects are further enhanced.

Also, the input image processing unit 135 may subject a partial image to other optional image processing, for example, such as contrast adjustment, noise reduction, deformation, hue adjustment, special effects, or the like, besides rotation and size correction.

Further, the image synthesizing device 111 can also be employed as a simple editing device. In this case, basically, synthetic processing is completed only with synthesizing of images input to the input systems (no synthetic processing is performed on the subsequent stage of the image synthesizing device 111), whereby the key generating unit 137 can be omitted.

Description has been made so far wherein the image synthetic processing is performed in accordance with the synthetic pattern selected by the user or the like from multiple synthetic patterns prepared beforehand. That is to say, in this case, the user simply specifies a desired synthetic pattern to instruct start of execution of the processing, and the image synthesizing device 111 realizes synthesizing of images of the specified synthetic pattern in accordance with the instruction thereof. However, the embodiment is not restricted to this arrangement, and for example, an arrangement may be made wherein the progress speed and progress direction of the synthetic pattern is controlled by the user during execution of the synthetic processing.

Figure 8A:
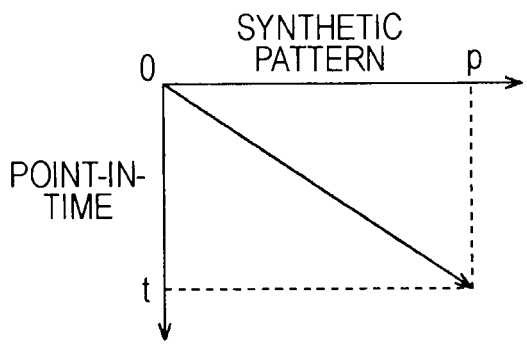
FIGS. 8A through 8G are diagrams describing examples of a synthetic pattern progress method.

FIGS. 8A through 8G illustrate synthetic pattern progress examples. In FIGS. 8A through 8G, the horizontal axis represents the progress of a synthetic pattern (picture), and the vertical direction represents time sequence. As shown in FIG. 8A, a synthetic pattern which progresses from a picture of No. "0" to a picture of No. "p" during point-in-time 0 to point-in-time t is taken as the basis.

Figure 8B:
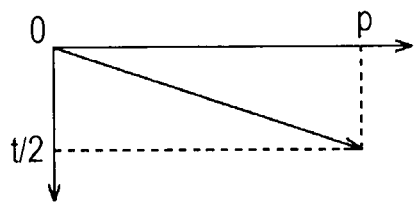
Figure 8C:
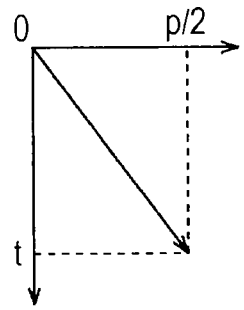

For example, an arrangement may be made wherein upon the user instructing speeding up of the progress speed of a synthetic pattern twice, as shown in FIG. 8B, the synthetic pattern progresses to the picture of No. "p" at point-in-time t/2. In this case, for example, control information such as mask information prepared for each picture, and so forth is selected one picture worth at a time, and is assigned to the consecutive respective pictures of an input image. Also, an arrangement may be made wherein upon the user instructing delaying of the progress speed of a synthetic pattern to ½, as shown in FIG. 8C, the synthetic pattern progresses to the picture of No. "p/2" at point-in-time t. In this case, for example, one picture worth of control information such as mask information and so forth is assigned to the consecutive two pictures of an input image.

Figure 8D:
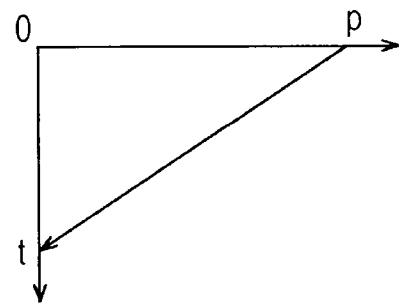

Further, for example, an arrangement may be made wherein upon the user instructing inverting of the progress direction of a synthetic pattern, as shown in FIG. 8D, as time sequence progresses, the synthetic pattern returns from the picture of No. "p" to the picture of No. "0". In this case, for example, the selection order of the control information such as the mask information prepared for each picture is inverted.

Figure 8E:
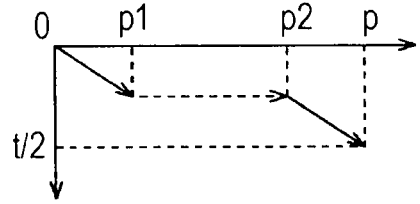

Also, for example, an arrangement may be made wherein upon the user instructing jumping in the progress of a synthetic pattern, as shown in FIG. 8E, the progress of the synthetic pattern jumps from the picture of No. "p1" to the picture of No. "p2" (the pictures therebetween are omitted). In this case, for example, the control information of the picture of No. "p2" is assigned to the picture following the picture of an input image assigned to the control information of the picture of No. "p1".

Figure 8F:
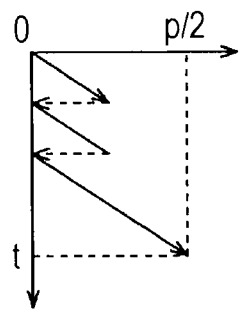

Further, for example, an arrangement may be made wherein upon the user instructing repeating of the progress of a synthetic pattern, as shown in FIG. 8F, the synthetic processing of the same picture is repeatedly executed. In this case, for example, the control information of the same mask information and so forth is assigned to the multiple pictures of an input image.

Figure 8G:
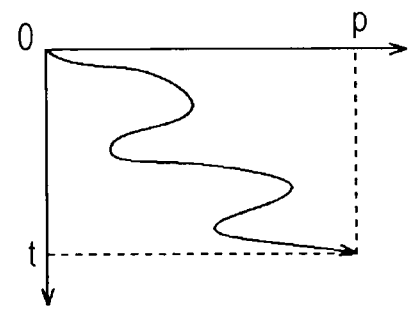

Also, for example, an arrangement may be made wherein upon the user instructing the progress of a synthetic pattern arbitrarily, as shown in FIG. 8G, the synthetic processing is executed such that the progress of the synthetic pattern becomes a free form curve (arbitrary curve).

Figure 9:
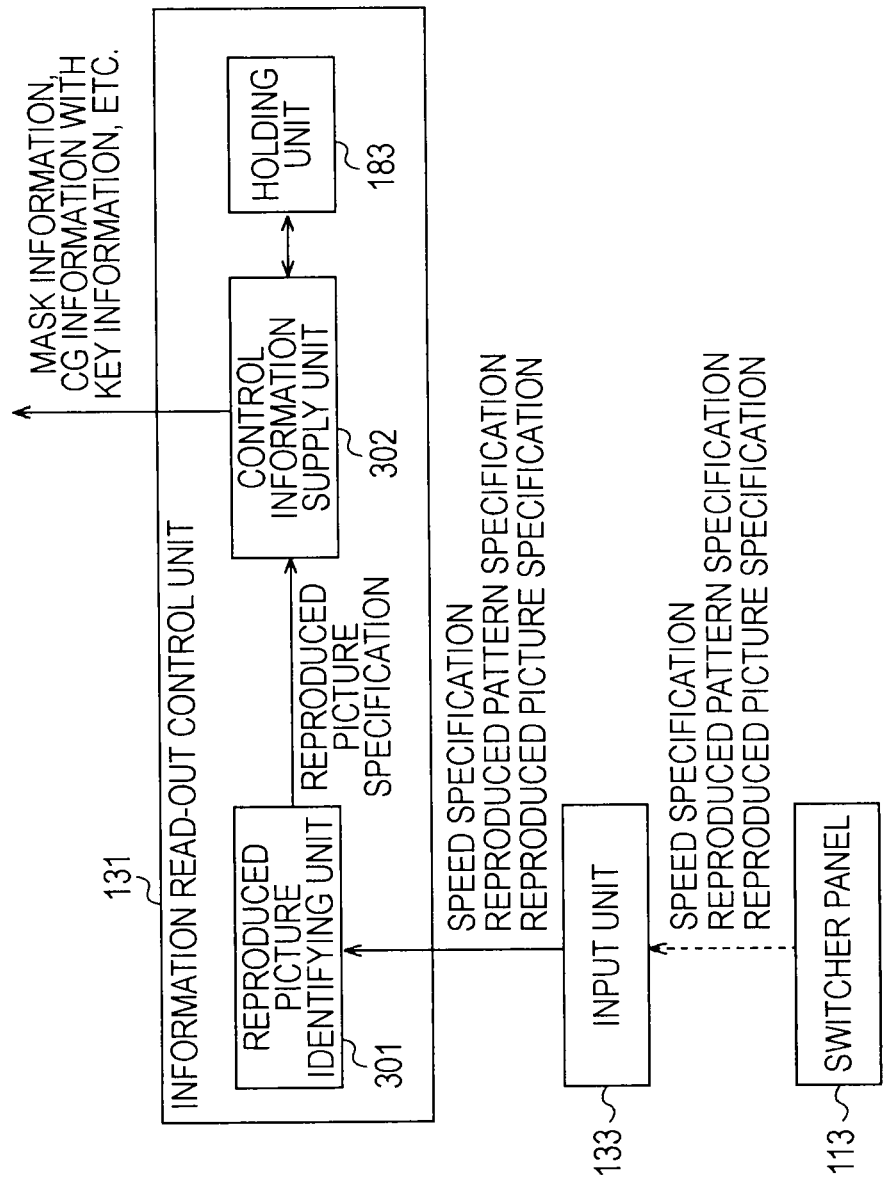
FIG. 9 is a block diagram illustrating a configuration example of an information read-out control unit.

In this case, as shown in FIG. 9, the information read-out control unit 131 includes a reproduced picture identifying unit 301, and control information supply unit 302 as well as the holding unit 183. Upon the user operating the switcher panel 113 to input a speed specification such as slow, fast forward, or the like, a reproducing pattern specification such as inverse return, repetition, or the like, a reproduced picture specification such as a jump destination specification, or the like, the specification thereof is supplied to the reproduced picture identifying unit 301 through the input unit 133.

The reproduced picture identifying unit 301 converts the input speed specification, reproducing pattern specification, or reproduced picture specification into a reproduced picture specification for specifying a picture with a synthetic pattern (i.e., a position to be processed (picture) with a synthetic pattern) to be processed next, and supplies the reproduced picture specification thereof to the control information supply unit 302. The control information supply unit 302 reads out the control information of the picture specified with the reproduced picture specification (mask information, CG information with key information, or the like) from the holding unit 183, and supplies this to the input image processing unit 135 and synthetic processing unit 136. That is to say, the control information is selected and read out in accordance with the progress pattern specified by the user, and is employed at the respective units. Thus, the synthetic pattern progresses in accordance with the progress pattern specified by the user. That is to say, the user can control the progress of the synthetic pattern freely in real time.

An example of the flow of the image synthetic processing in this case will be described with reference to the flowchart in FIG. 10. The image synthetic processing shown in FIG. 10 is processing corresponding to the image synthetic processing in FIG. 5. The processing in each of the steps S301 through S303 is executed in the same way as the processing in each of the steps S101 through S103.

In step S304 in FIG. 10, the input unit 133 accepts a reproducing control instruction from the user or switcher panel 113. In step S305, the reproduced picture identifying unit 301 identifies a reproduced picture based on the reproducing control instruction. In step S306, the control information supply unit 302 supplies the control information of the reproduced picture of the specified synthetic pattern to the respective units.

Figure 5:
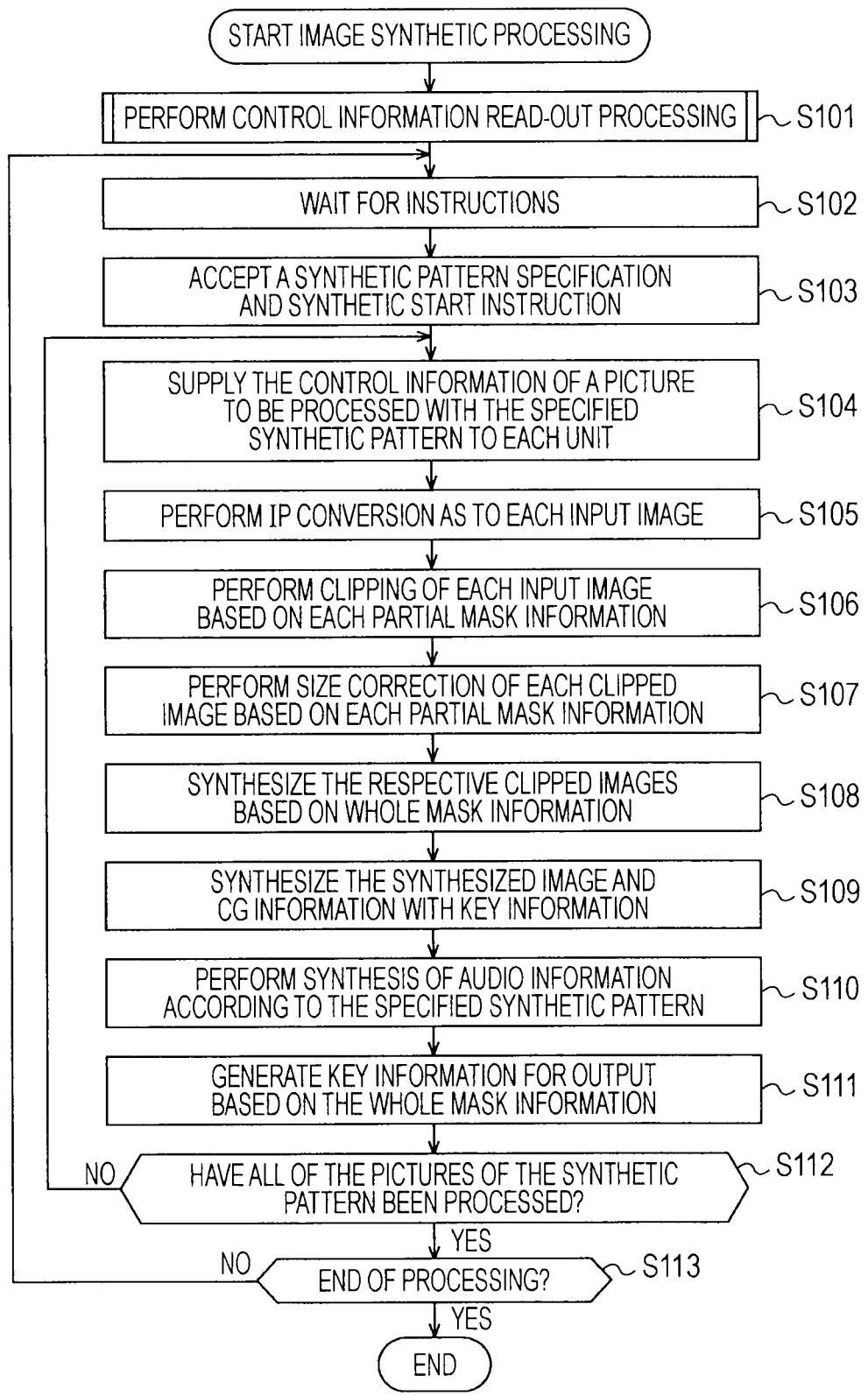
FIG. 5 is a flowchart describing an example of the flow of image synthetic processing.

The processing in each of the steps S307 through S315 is executed in the same way as the processing in each of the steps S105 through S113 in FIG. 5.

As described above, the image processing system 100 (image synthesizing device 111) can control the progress of the synthetic pattern in real time in accordance with the user's instruction.

Note that the above-mentioned various types of control information are generated beforehand before the image synthetic processing. The generation thereof is shown in FIG. 11.

First, generation of CG information is performed by employing a predetermined tool or the like (processing 331). According to this processing 331, CG information 351, key information 352, and mask image information 353 are generated. Upon the processing 331 being ended, generation of mask information is performed next (processing 332). With this processing 332, the above-mentioned mask image information 343, and mask meta information 354 including a reduction ratio 361, rotation angle 362, center coordinates 363, and so forth are synthesized, thereby generating mask information 355.

The CG information 351, key information 352, and mask information 355 thus generated are recorded in the image synthesizing device 111 (processing 333). At this time, the CG information 351 and key information 352 are compressed and stored as CG information with key information. Also, the mask information 355 is compressed by a predetermined method and stored.

Subsequently, the synthetic processing is performed by employing such control information tentatively, and confirmation of the synthetic results is performed (processing 334). In a case where the synthetic results are not satisfactory, correction of parameters or the like is performed (processing 335). Upon the correction being ended, the processing is returned to the processing 331 or processing 332, and the processing thereof and thereafter is executed.

Figure 12A:
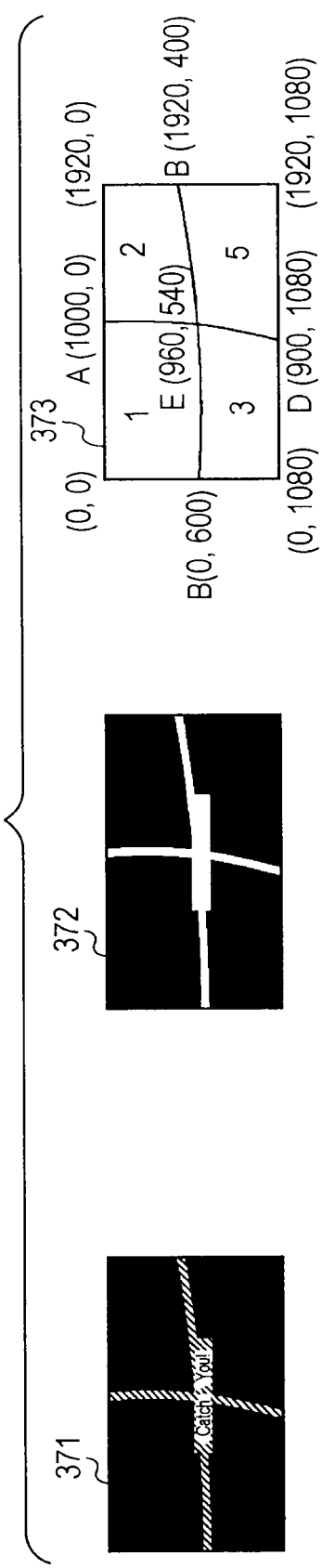
FIGS. 12A and 12B are diagrams describing an example of a control information updating.
Figure 12B:
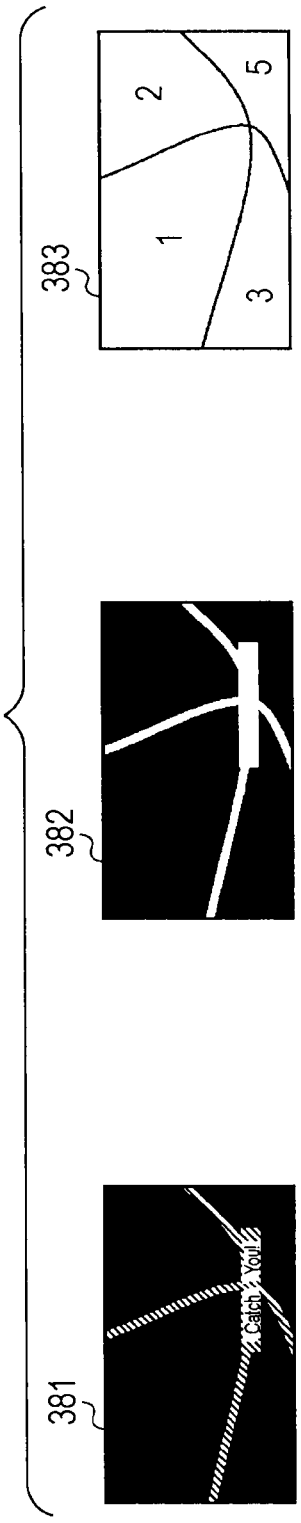

Such control information is generated beforehand in accordance with the workflow as described above. Note that an arrangement may be made wherein such control information can be updated by the user in real time. For example, as shown in FIG. 12, an arrangement may be made wherein CG information with key information is displayed on a monitor or the like, the user deforms the displayed CG information with key information thereof by operating a mouse or touch pen or the like, whereby the structure (design) such as CG information or the like can be updated (i.e., the structure of the synthetic image can be updated). For example, upon CG information with key information 371 displayed such as shown in FIG. 12A being deformed so as to shift the position of the center portion like the CG information with key information 381 shown in FIG. 12B, the structures of key information 372 and mask information 373 (FIG. 12A) are also changed in accordance with change in the CG information with key information like key information 382 and mask information 383 (FIG. 12B).

In such a case, in order to facilitate updating of the control information, the CG information with key information and mask image information are stored in the storage unit 132 not as bitmap but as vertex coordinates and texture information. Subsequently, when reading out such information from the holding unit 183, the information read-out control unit 131 subjects the information to rendering in real time to convert the information into bitmap, and supplies this to the respective units.

That is to say, as shown in FIG. 13, rendering information for CG information with key information 401, whole mask information 402, audio information 176, and audio synthetic information 177 are stored in the storage unit 132. The rendering information for CG information with key information 401 is made up of vertex-coordinates information 411 and texture information 412, and is converted into bitmap CG information with key information by later-described rendering processing.

The whole mask information 402 includes rendering information for mask image information 421 and mask meta information 173. The rendering information for mask image information 421 is made up of vertex-coordinates information 431 and texture information 432, and is converted into bitmap mask image information by later-described rendering processing.

That is to say, in the cases of vertex coordinates and texture information as well, the content of the information thereof is the same as in the case of bitmap except that the formats thereof differ. Such information is supplied to the holding unit 183 and held therein.

The user operates the switcher panel 113 to input a CD design modification instruction such as described with reference to FIG. 12. Upon obtaining the CG design modification instruction thereof, the input unit 133 supplies the CG design modification instruction thereof to the coordinates information for CG modification generating unit 451.

The information read-out control unit 131 includes the coordinates information for CG modification generating unit 451 and real-time rendering unit 452 as well as the holding unit 183. The coordinates information for CG modification generating unit 451 generates coordinates information after design modification with the picture to be processed based on the CG design modification instruction input through the input unit 133, and supplies this to the real-time rendering unit 452. Upon obtaining the CG information with key information of the picture to be processed from the holding unit 183, the real-time rendering unit 452 performs rendering based on the coordinates information after modification obtained from the coordinates information for CG modification generating unit 451 to generate bitmap CG information with key information and key information. Similarly, the real-time rendering unit 452 obtains the rendering information for mask image information 421 of the picture to be processed from the holding unit 183, performs rendering based on the coordinates information after modification obtained from the coordinates information for CG modification generating unit 451 to generate bitmap mask image information. The real-time rendering unit 452 employs the mask image information thereof to generate whole mask information and partial mask information. The real-time rendering unit 452 supplies such generated information to the respective units.

An example of the flow of the image synthetic processing in this case will be described with reference to the flowchart in FIGS. 14 and 15. Note that this flowchart corresponds to the flowchart of the image synthetic processing in FIG. 5.

Figure 14:
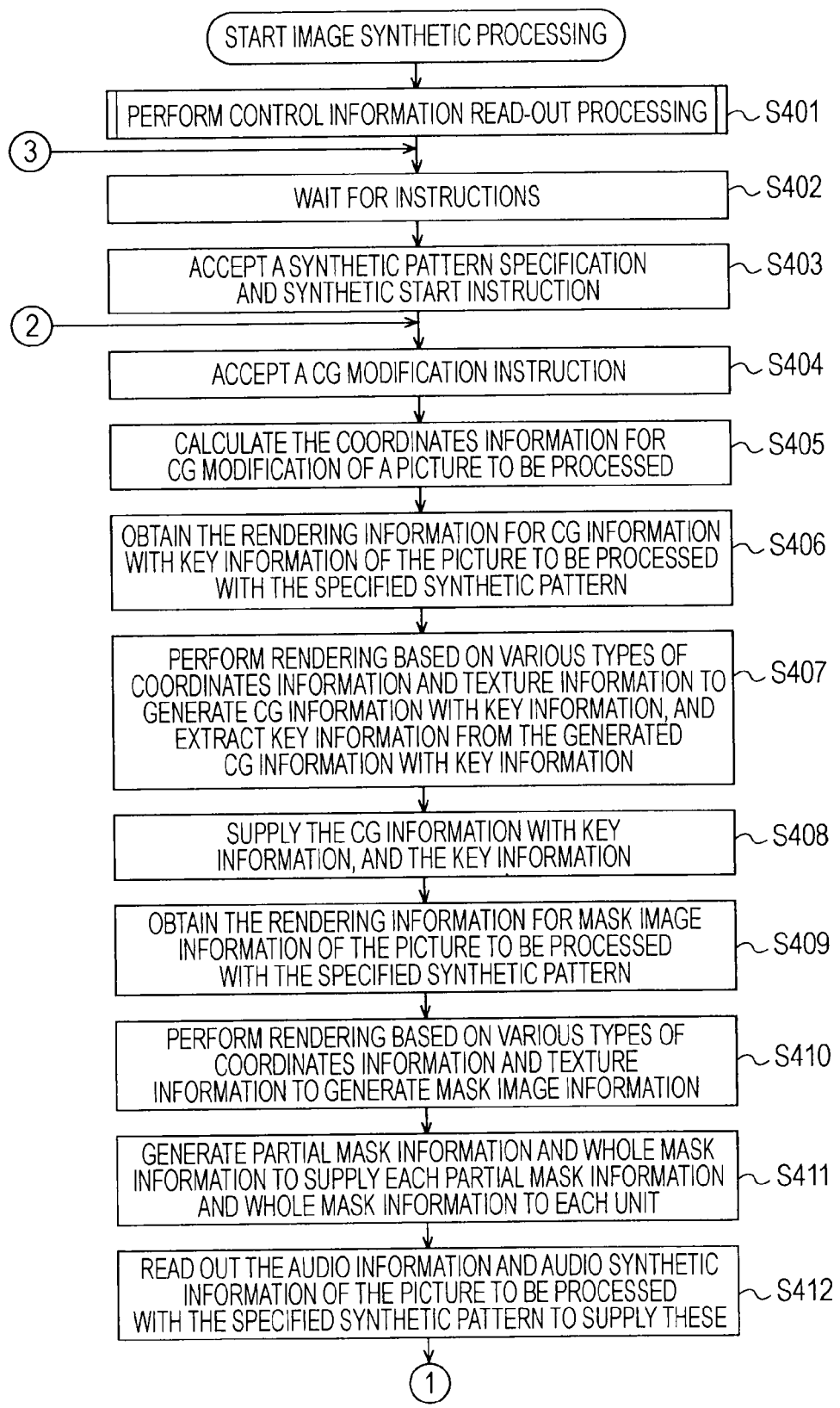
FIG. 14 is a flowchart describing yet another example of the flow of the image synthetic processing.

The processing in each of the steps S401 through S403 in FIG. 14 is executed in the same way as with the processing in each of the steps S101 through S103 in FIG. 5. However, with the control information read-out processing in step S401, the processing such as generating of partial mask information, extraction of key information, and so forth is omitted.

In step S404 in FIG. 14, the input unit 133 accepts a CG design modification instruction. In step S405, the coordinates information for CG modification generating unit 451 calculates the coordinates information for CG modification of the picture to be processed based on the CG design modification instruction.

In step S406, the real-time rendering unit 452 obtains the rendering information for CG information with key information of the picture to be processed of the specified synthetic pattern from the holding unit 183. In step S407, the real-time rendering unit 452 performs rendering based on various types of coordinates information and texture information to generate bitmap CG information with key information. Further, the real-time rendering unit 452 extracts key information (bitmap) from the generated bitmap CG information with key information. In step S408, the real-time rendering unit 452 supplies the CG information with key information and key information (both are bitmap) to the respective units.

In step S409, the real-time rendering unit 452 obtains the rendering information for mask image information 421 of the picture to be processed of the specified synthetic pattern from the holding unit 183. In step S410, the real-time rendering unit 452 performs rendering based on various coordinates information and texture information to generate bitmap mask image information. In step S411, the real-time rendering unit 452 generates whole mask information and partial mask image information from the mask image information thereof, and further supplies the respective pieces of partial mask information and whole mask information to the respective units as appropriate.

In step S412, the information read-out control unit 131 reads out the audio information and audio synthetic information of the picture to be processed of the specified synthetic pattern from the holding unit 183 to supply these to the audio synthesizing unit 163.

Figure 15:
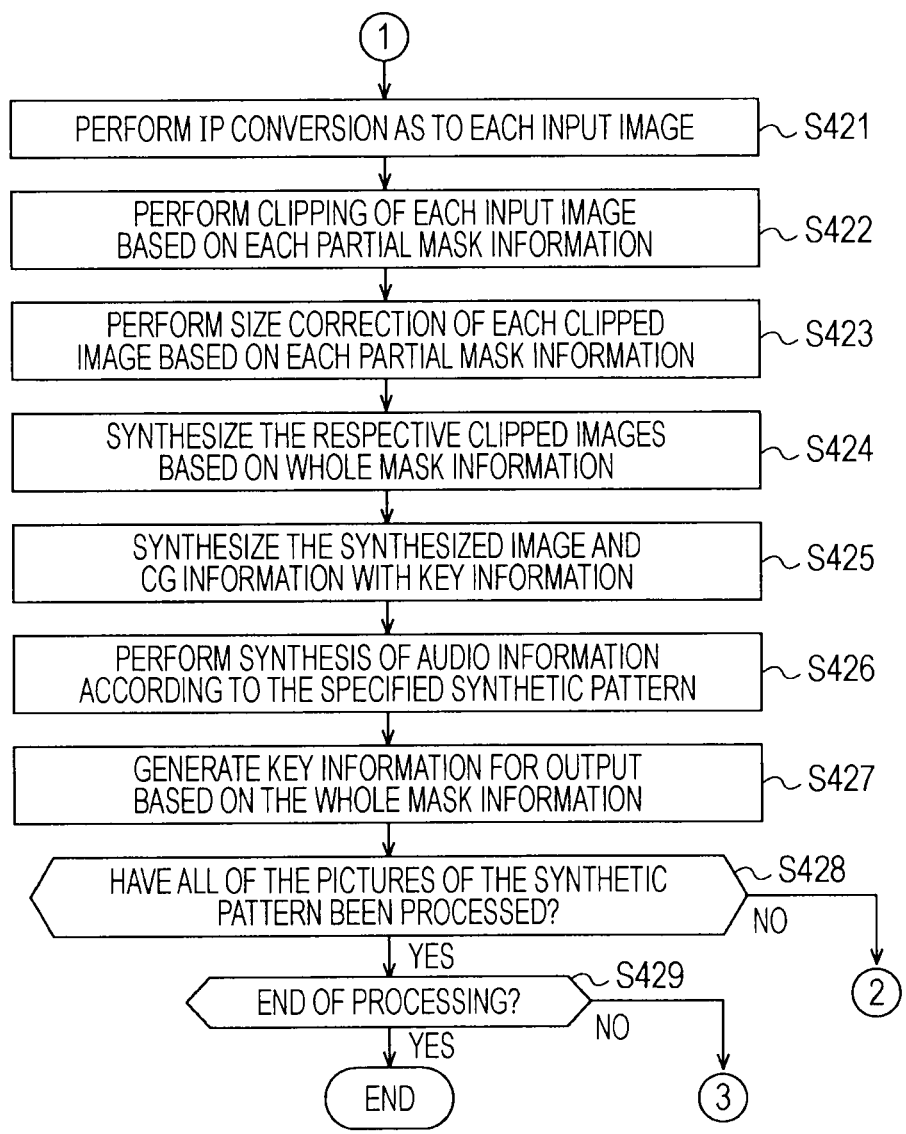
FIG. 15 is a flowchart following FIG. 14 describing yet another example of the flow of the image synthetic processing.

The processing in each of the steps S421 through S429 in FIG. 15 is executed in the same way as with the processing in each of the steps S105 through S113 in FIG. 5.

As described above, the image processing system 100 (image synthesizing device 111) can update the control information such that the user modifies the structure of a synthetic image during synthesizing of images.

Note that description has been made so far regarding the case where the IP conversion is performed as preprocessing, but this preprocessing may be any processing as long as the processing is performed as to an input image. For example, as shown in FIG. 16, an arrangement may be made wherein face detection is performed from each input image instead of the IP conversion, and clipping of an image is performed with the detected face image as the center.

Figure 16:
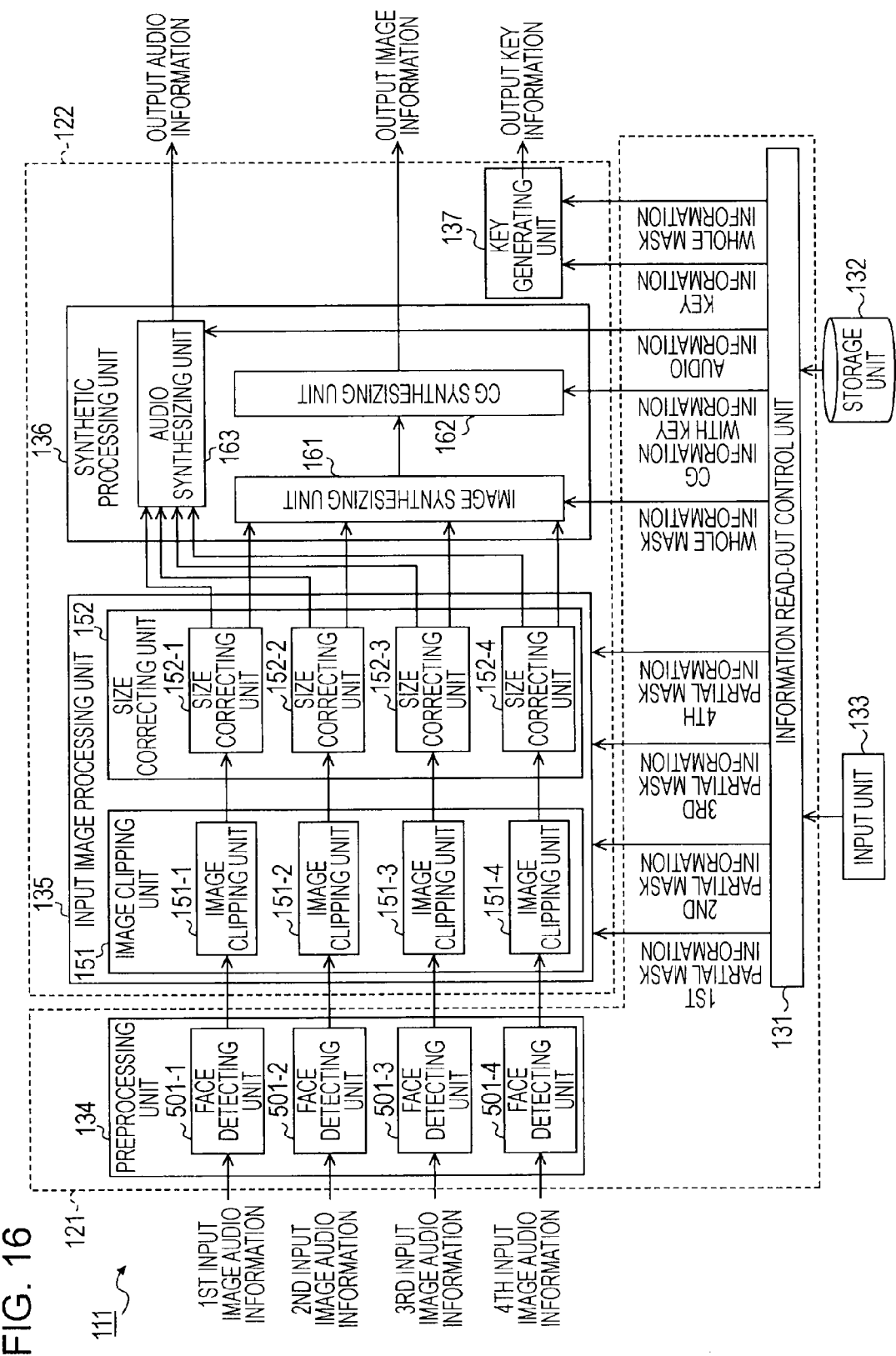
FIG. 16 is a block diagram illustrating another configuration example of the image synthesizing device to which an embodiment of the present invention has been applied.

In FIG. 16, with the preprocessing unit 134, instead of the IP conversion units 141-1 through 141-4, face detecting units 501-1 through 501-4 are provided.

The face detecting unit 501-1 performs face detection as to the image information of the fist input image audio information, and sets the center coordinates for clipping based on the position of the detected face image. The face detecting unit 501-1 supplies the set center coordinates to the image clipping unit 151-1 along with the first input image audio information. The image clipping unit 151-1 employs the center coordinates thereof to update the center coordinates of the first partial mask information supplied from the information read-out control unit 131, and performs clipping of a partial image based on the first partial mask information after updating.

The face detecting unit 501-2 performs face detection as to the image information of the second input image audio information, and sets the center coordinates for clipping based on the position of the detected face image. The face detecting unit 501-2 supplies the set center coordinates to the image clipping unit 151-2 along with the second input image audio information. The image clipping unit 151-2 employs the center coordinates thereof to update the center coordinates of the second partial mask information supplied from the information read-out control unit 131, and performs clipping of a partial image based on the second partial mask information after updating.

The face detecting unit 501-3 performs face detection as to the image information of the third input image audio information, and sets the center coordinates for clipping based on the position of the detected face image. The face detecting unit 501-3 supplies the set center coordinates to the image clipping unit 151-3 along with the third input image audio information. The image clipping unit 151-3 employs the center coordinates thereof to update the center coordinates of the third partial mask information supplied from the information read-out control unit 131, and performs clipping of a partial image based on the third partial mask information after updating.

The face detecting unit 501-4 performs face detection as to the image information of the fourth input image audio information, and sets the center coordinates for clipping based on the position of the detected face image. The face detecting unit 501-4 supplies the set center coordinates to the image clipping unit 151-4 along with the fourth input image audio information. The image clipping unit 151-4 employs the center coordinates thereof to update the center coordinates of the fourth partial mask information supplied from the information read-out control unit 131, and performs clipping of a partial image based on the fourth partial mask information after updating.

An example of the flow of the image synthetic processing in this case will be described with reference to the flowchart in FIG. 17. Note that this flowchart corresponds to the flowchart of the image synthetic processing in FIG. 5.

Figure 17:
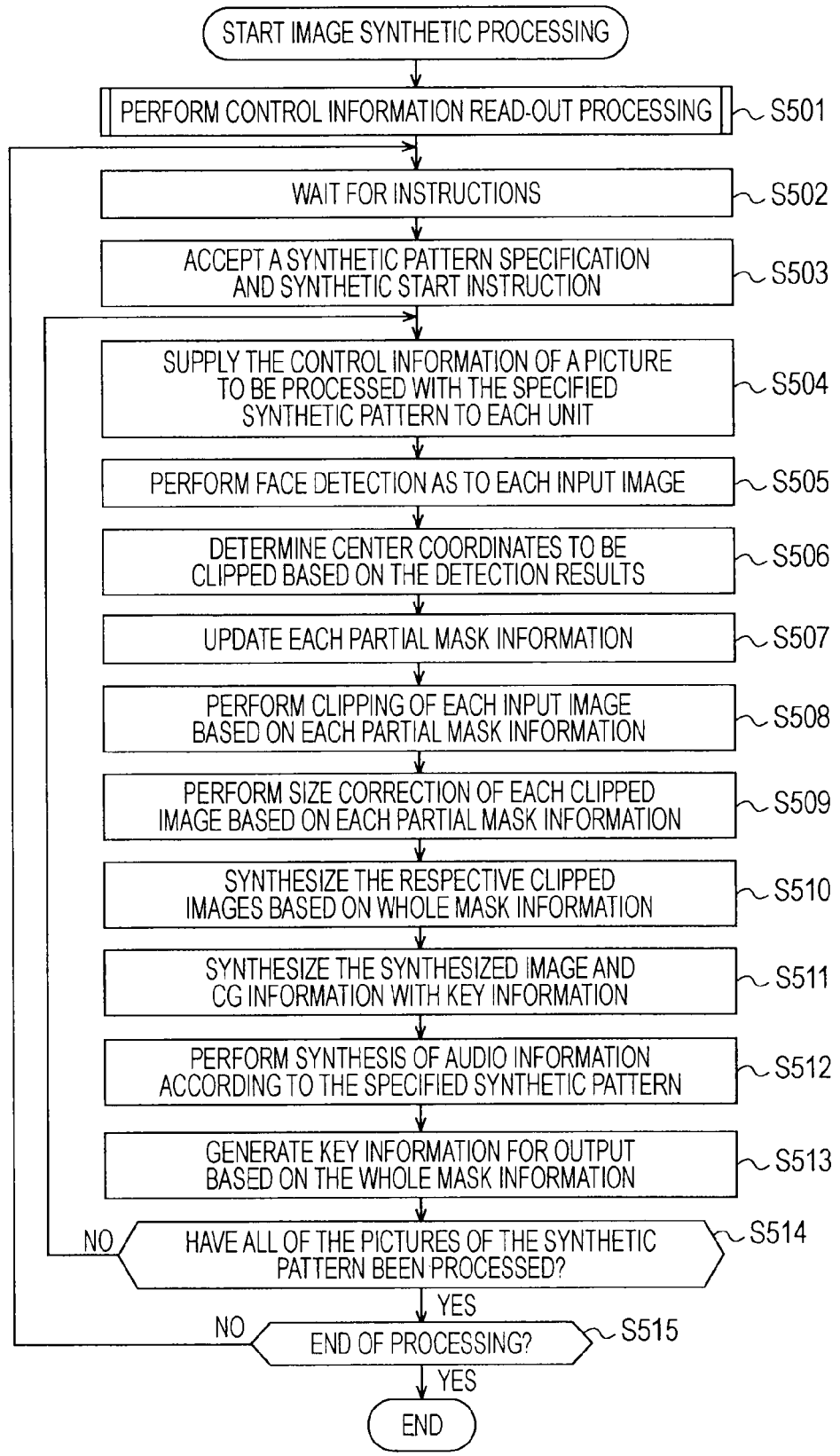
FIG. 17 is a flowchart describing yet another example of the flow of the image synthetic processing.

The processing in each of the steps S501 through S504 in FIG. 17 is executed in the same way as with the processing in each of the steps S101 through S104 in FIG. 5.

In step S505 in FIG. 17, the face detecting units 501-1 through 501-4 of the preprocessing unit 134 performs face detection as to each input image. In step S506, the face detecting units 501-1 through 501-4 determines the center coordinates for clipping based on the detection results. In step S507, the image clipping unit 151 (image clipping units 151-1 through 151-4) employs the values determined in step S506 to update (the center coordinates of) each piece of the partial mask information.

The processing in each of the steps S508 through S515 is executed in the same way as with the processing in each of the steps S106 through S113 in FIG. 5.

As described above, with the preprocessing unit 134, a face image is detected from an input image, and a clipping position is determined based on the position of the face thereof, whereby the input image processing unit 135 can clip a partial image having a more suitable picture. That is to say, the image synthesizing device 111 can further improve the visual effects of the synthetic results (synthetic image).

Note that description has been made so far wherein bitmap data such as the mask image information 172 or CG information with key information 174 is compressed by a predetermined method and stored in the storage unit 132. A specific example of this compression method will be described below.

First, the mask image information 172 will be described. As schematically shown in FIG. 3, the mask image information 172 specifies whether to select the image of which input system as a synthetic result in increments of pixels. The specifying order of the respective pixels may be any order, but the raster scan method is employed for simplifying the processing. That is to say, as schematically shown in FIG. 3, the mask image information 172 has features such that data having the same value is more likely to continue (there are many repetitions).

Therefore, the mask image information 172 can be compressed effectively, for example, by being subjected to the run length coding in increments of bytes. That is to say, the mask image information 172 is encoded by the run length coding, whereby the image synthesizing device 111 can improve use efficiency of a storage region and bus region.

Note that in the case of the run length coding, specifying a value and length wherein the value thereof continues is sufficient, so the data structure after compression becomes relatively simple. Accordingly, the information read-out control unit 131 can perform the decoding processing of the mask image information 172 readily at high speed.

Next, the CG information with key information 174 (key information and CG information) will be described. CG information is information for display, so in general, the picture thereof becomes complicated as compared to the mask image information 172. Also, with a synthetic pattern, CG information is frequently taken as an moving image, and has features that the information is more likely to change between pictures greatly.

In a case where the CG information with key information having such features is encoded, for example, by compression encoding employing discrete cosine transform or motion vectors, there is a possibility that, with a synthetic image, noise which is visually conspicuous may occur, such as so-called mosquito noise. That is to say, the somesthetic image quality of a synthetic image is likely to be reduced.

On the other hand, for example, in the case of compression encoding employing wavelet transform, even if information loss or the like occurs, with a synthetic image, the resolution is likely to decrease (so-called blurring), which is inconspicuous visually. That is to say, the somesthetic image quality of a synthetic image is unlikely to be reduced.

Also, the CG information with key information 174 is processed in increments of pictures, so the intra coding facilitates decoding processing, which is suitable.

Accordingly, with regard to encoding of the CG information with key information 174, it is desirable to employ the compression encoding of the intra coding method employing wavelet transform. However, in the case of the JPEG 2000 (Joint Photographic Experts Group 2000) method, the processing load is great.

Therefore, the compression encoding method which employs wavelet transform to perform processing in increments of smaller data than a picture is applied to encoding of the CG information with key information 174. This compression encoding method will be described below.

Figure 18:
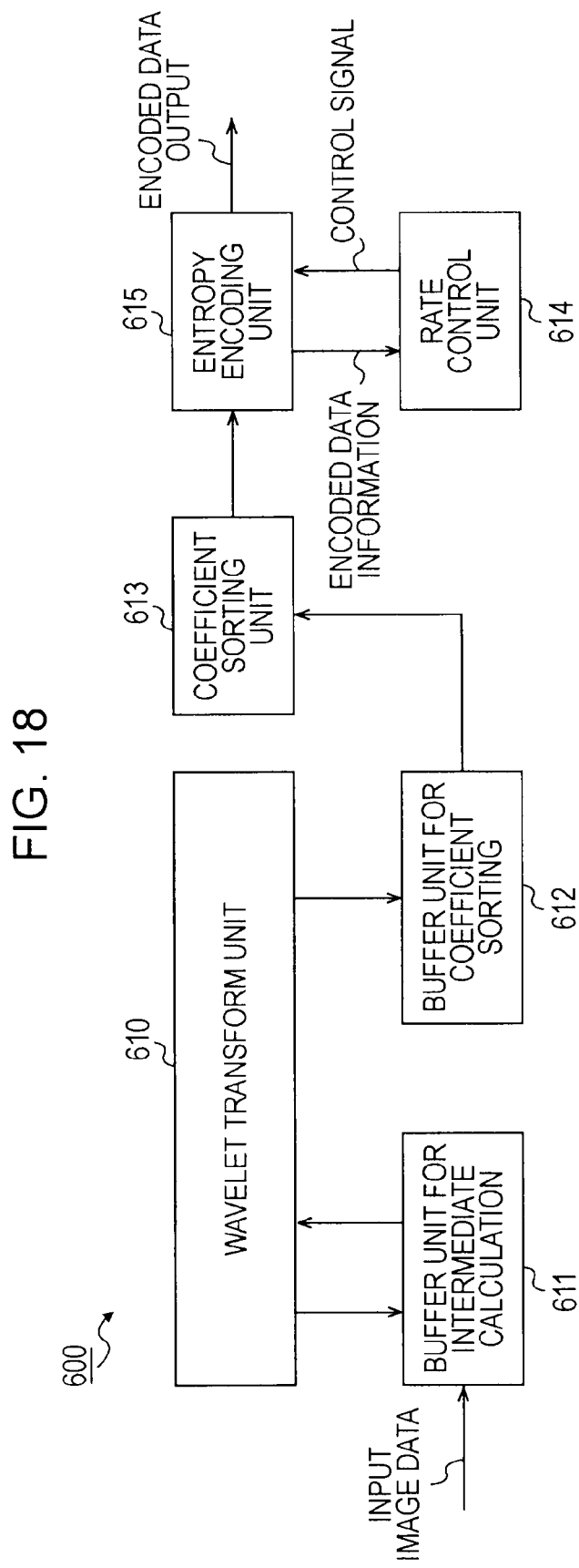
FIG. 18 is a block diagram illustrating a configuration example of an encoding device.

FIG. 18 is a block diagram illustrating a configuration example of an encoding device according to this compression encoding. In FIG. 18, an encoding device 600 includes a wavelet transform unit 610, buffer unit for intermediate calculation 611, buffer unit for coefficient sorting 612, coefficient sorting unit 613, rate control unit 614, and entropy encoding unit 615.

The image data input to the encoding device 600 is temporarily buffered in the buffer unit for intermediate calculation 611. The wavelet transform unit 610 subjects the image data buffered in the buffer unit for intermediate calculation 611 to wavelet transform. Specifically, the wavelet transform unit 610 reads out the image data from the buffer unit for intermediate calculation 611, subjects this to filter processing by an analysis filter to generate low-frequency component coefficient data and high frequency component coefficient data, and stores the generated coefficient data in the buffer unit for intermediate calculation 611. The wavelet transform unit 610 includes a horizontal analysis filter and vertical analysis filter, and subjects an image data group to analysis filter processing regarding both of the horizontal direction and vertical direction of the screen. The wavelet transform unit 610 reads out the low-frequency component coefficient data stored in the buffer unit for intermediate calculation 611 again, and subjects the read coefficient data to filter processing by the analysis filters to further generate high-frequency component coefficient data and low-frequency component coefficient data. The generated coefficient data is stored in the buffer unit for intermediate calculation 611.

Figure 19:
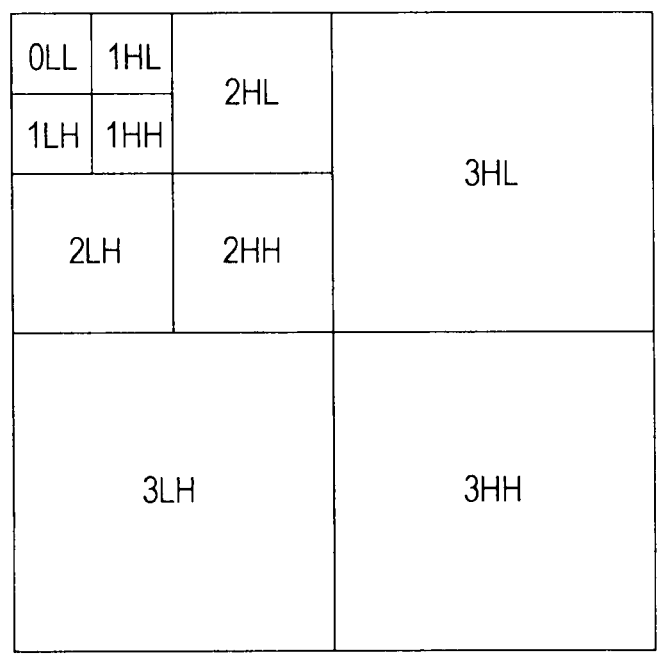
FIG. 19 is a schematic diagram schematically describing wavelet transform.

The wavelet transform unit 610 recursively repeats this processing as to low-frequency components in the vertical direction and horizontal direction. With wavelet transform, for example, as schematically shown in FIG. 19, processing for dividing image data into a high-spatial-frequency band data and a low-spatial-frequency band data is performed recursively as to the low-spatial-frequency band data obtained as a result of the division. Thus, the low-spatial-frequency band data is narrowed down to a smaller region, thereby enabling effective compression encoding.

Note that FIG. 19 is an example in a case where processing for dividing the lowest-frequency component region of image data into a low-frequency component region L and a high-frequency component region H is repeated three times, and a division level indicating a total of divided hierarchies is set to 3. In FIG. 19, "L" and "H" represent a low-frequency component and high-frequency component, respectively, and with regard to the order of "L" and "H", the front side indicates the band as a result of the division in the horizontal direction, and the rear side indicates the band as a result of the division in the vertical direction. Also, the numbers before "L" and "H" indicate the hierarchy of the region thereof, wherein the lower the hierarchical level of a low-frequency component, the smaller the value thereof.

Also, as can be understood from the example in FIG. 19, from the lower left region to the upper left region of the screen are subjected processing in a stepwise manner, and accordingly, low-frequency components are narrowed down. Specifically, with the example in FIG. 19, the lower right region of the screen is taken as a region 3HH including the least low-frequency components (including the most high-frequency components), the upper left region obtained by the screen being divided into four regions is further divided into four regions, and of the four divided regions thereof, the upper left region is further divided into four regions.

The region at the most upper left corner is taken as a region 0LL including the most low-frequency components. The reason why conversion and division are performed as to low-frequency components repeatedly is that the energy of an image is concentrated in low-frequency components.

The wavelet transform unit 610 repeats wavelet transform as described above, and upon the division level reaching a predetermined level, reads out the coefficient data from the buffer unit for intermediate calculation 611, and writes the read coefficient data in the buffer unit for coefficient sorting 612.

The coefficient sorting unit 613 reads out the coefficient data written in the buffer unit for coefficient sorting 612 in the order of performing inverse wavelet transform at the time of decoding, and supplies this to the entropy encoding unit 615. The entropy encoding unit 615 encodes the supplied coefficient data by a predetermined entropy encoding method, for example, such as the Huffman coding or arithmetic coding.

The entropy encoding unit 615 operates simultaneously with the rate control unit 614, and is controlled such that the bit rate of output compressed encoded data becomes generally a certain value. Specifically, the rate control unit 614 supplies a control signal, which performs control such that the encoding processing by the entropy encoding unit 615 is ended when or immediately before the bit rate of the data compressed and encoded by the entropy encoding unit 615 reaches a target value based on the encoded data information from the entropy encoding unit 615, to the entropy encoding unit 615. The entropy encoding unit 615 outputs encoded data when the encoding processing is ended according to the control signal supplied from the rate control unit 614.

Note that the entropy encoding unit 615 subjects the coefficient data read out from the coefficient sorting unit 613 to quantization for the first time, and subjects the obtained quantization coefficient to information source encoding processing such as the Huffman coding or arithmetic coding or the like, whereby further improvement of compression effects can be expected. Any method may be employed as this quantizing method, and for example, a common method, i.e., such as shown in the following Expression (1), a method for diving coefficient date W by quantization step size Δ may be employed.

$$\text{Quantization coefficient} = W/\Delta \quad (1)$$

The quantization step size Δ at this time is calculated, for example, at the rate control unit 614.

Note that the wavelet transform unit 610 performs the filter processing by wavelet transform in a stepwise manner by dividing the filter processing by wavelet transform into processing in every several lines regarding the vertical direction of the screen. The number of lines is based on the number of lines for generating one line worth of the lowest-frequency components after the image data is divided into high-frequency components and low-frequency components recursively.

Note that, hereinafter, gathering of lines for generating the lowest-frequency components of one line worth (coefficient data of one line worth of the sub band of the lowest-frequency components) including other sub bands will be referred to as "precinct (or line block)". The term "line" mentioned here means the pixel data or coefficient data of one line worth formed within a picture or field corresponding to the image data before wavelet transform, or within each sub band. That is to say, the precinct (or line block) means, with the original image data before wavelet transform, the pixel data group of the number of lines worth for generating the coefficient data of one line worth of the sub band of the lowest-frequency components after wavelet transform, or the coefficient data group of each sub band obtained by subjecting the pixel data group thereof to wavelet transform.

Figure 20A:
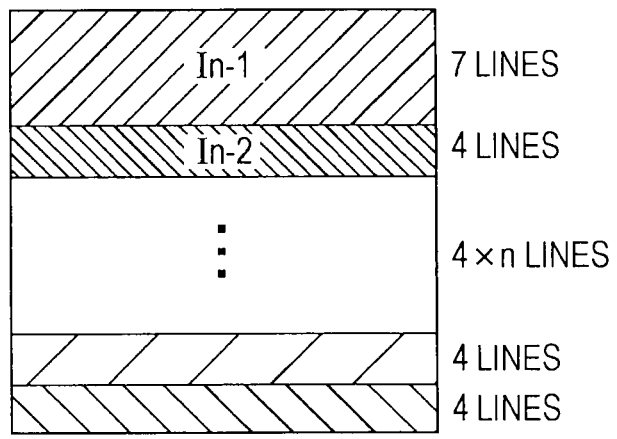
FIGS. 20A through 20C are schematic diagrams schematically illustrating the flow of wavelet transform and inverse wavelet transform.
Figure 20B:
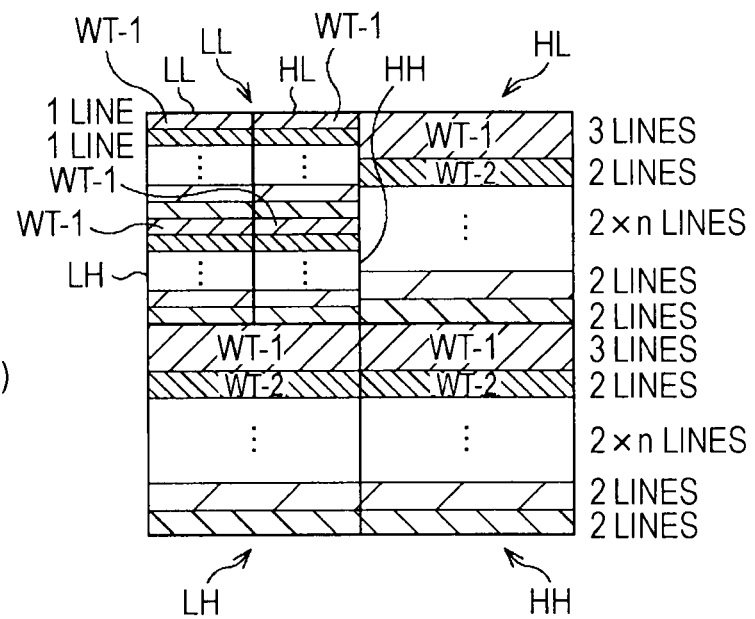
Figure 20C:
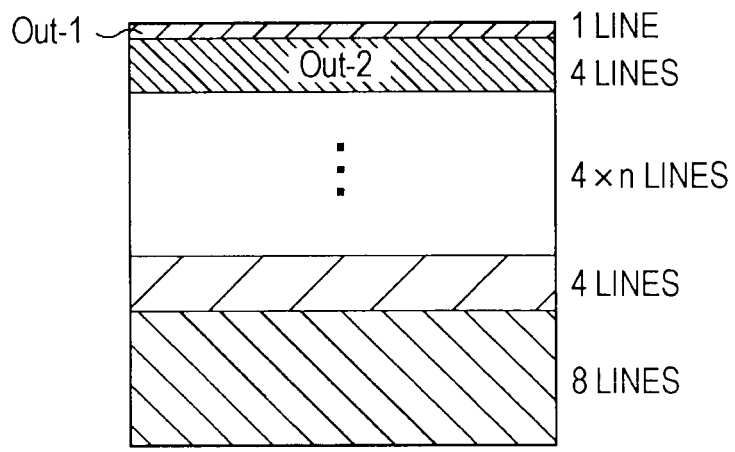

FIGS. 20A through 20C are examples wherein input image data is subjected to filter processing by wavelet transform by employing 5×3 filters until the division level=2. With the wavelet transform unit 610, as shown in an example in FIG. 20A, first line through seventh line of input image data is subjected to first filter processing in each of the horizontal direction and vertical direction (In-1 in FIG. 20A).

With the processing of the division level=1 of the first filter processing, the coefficient data of three lines worth is generated, and is, as shown in an example in FIG. 20B, disposed in each of regions HH, HL, and LH formed at the division level=1 (WT-1 in FIG. 20B). Also, a region LL formed at the division level=1 is further divided into four regions at the filter processing in the horizontal and vertical directions at the division level=2.

With second filter processing and thereafter by the wavelet transform unit 610, the filter processing is performed in every four lines (In-2 in FIG. 20A), coefficient data of every two lines at the division level=1 is generated (WT-2 in FIG. 20B), coefficient data of every one line is generated at the division level=2 is generated. Such coefficient data is, as shown in an example in FIG. 20B, disposed following the coefficient data generated at the first filter processing of the regions HH, HL, and LH formed at the division level=1. Similarly, within the region LL at the division level=1, the coefficient of one line worth generated at the filter processing of the division level=2 is disposed in the region LL, the coefficient of one line worth is disposed in each of the regions HH, HL, and LH.

When the data subjected to wavelet transform is decoded as shown in FIG. 20B, as shown in an example in FIG. 20C, in response to the first filter processing by the first through seventh lines on the encoding side, the first line by the first synthetic processing on the decoding side is output (Out-1 in FIG. 20C). Hereafter, in response to the second to last filter processing from the second filter processing on the encoding side, every four lines are output (Out-2 and so on in FIG. 20C). Subsequently, in response to the last filter processing on the encoding side, eight lines are output on the decoding side.

The coefficient data generated from the high-frequency component side to the low-frequency component side at the wavelet transform unit 610 is stored in the buffer unit for coefficient sorting 612 sequentially. Upon the coefficient data being accumulated in the buffer unit for coefficient sorting 612 until sorting of the coefficient data is enabled, the coefficient sorting unit 613 sorts the coefficient data in the order used for the synthetic processing at the time of decoding (inverse wavelet transform processing), and reads out this from the buffer unit for coefficient sorting 612. The read coefficient data is sequentially supplied to the entropy encoding unit 615.

Figure 21:
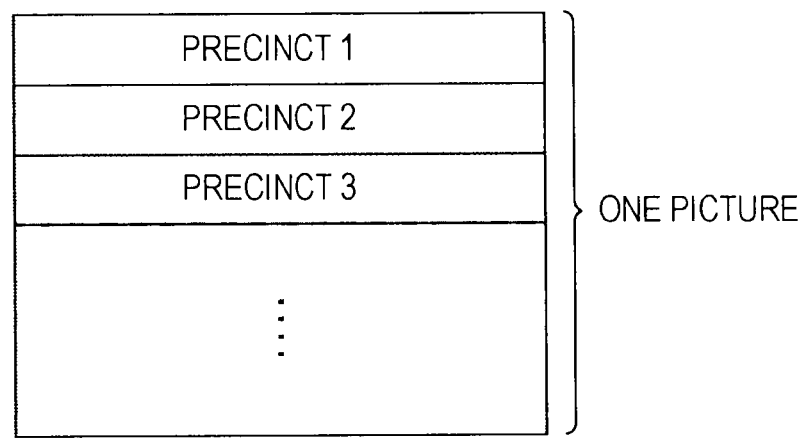
FIG. 21 is a schematic diagram illustrating a structure example of a picture.

As described above, the encoding device 600 divides the image data of one picture into multiple precincts, and performs encoding for each precinct thereof, which is illustrated in FIG. 21.

Figure 22:
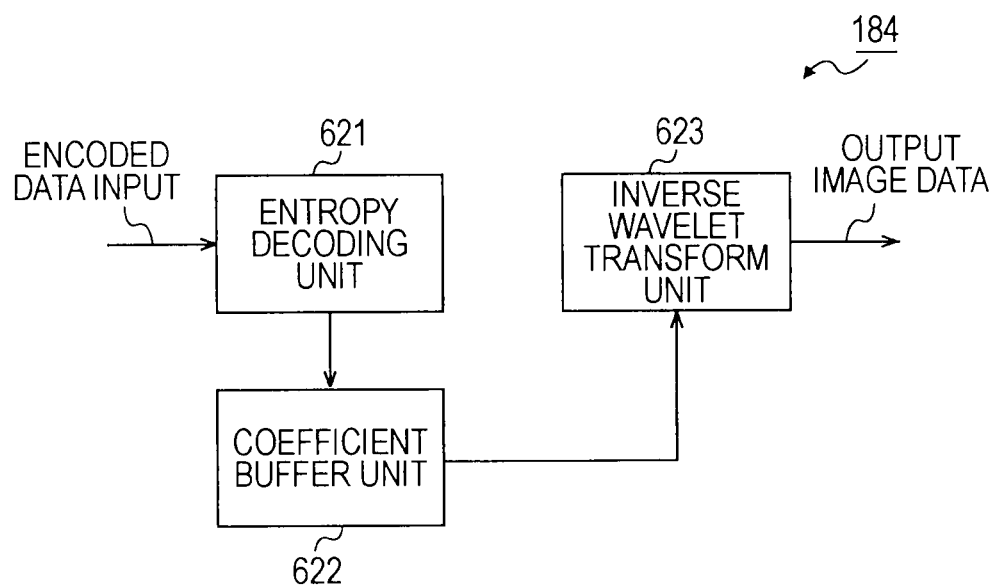
FIG. 22 is a block diagram illustrating a configuration example of a decoding unit.

FIG. 22 illustrates a configuration example of the decoding unit 184 in a case where the CG information with key information 174 is encoded by such a method and stored in the storage unit 132.

The CG information with key information 174 read out from the storage unit 132 is supplied to the decoding unit 184 in FIG. 22, where the entropy code is decoded to obtain coefficient data. The coefficient data is stored in the coefficient buffer unit 622. The inverse wavelet transform unit 623 employs the coefficient data stored in the coefficient buffer unit 622 to perform synthetic filter processing by a synthetic filter, and stores the results of the synthetic filter processing in the coefficient buffer unit 622 again. The inverse wavelet transform unit 623 repeats this processing according to the division level to obtain decoded image data, i.e., baseband (uncompressed) CG information with key information 174.

As described above, in the case of this compression encoding method, decoding can be readily performed as compared to the case of JPEG 2000, whereby decoding processing load can be reduced. Note that, in the case of this compression encoding method, sorting of the coefficients is performed at the time of encoding as described above, thereby further reducing processing load at the time of decoding.

Note that, from a point of view of compression efficiency, for example, MPEG (Moving Picture Experts Group) is more effective. Accordingly, for example, in the case of CG information wherein motion is small, and the data quantity is great so as to include, for example, 100 or more types of images, it is desirable to perform compression by MPEG. However, in this case, the decoding unit 184 also has to handle MPEG. Further, various types of encoding methods as describe above may be employed by being combined as appropriate. In this case, the decoding unit 184 has to handle all of the employed methods.

The above-mentioned series of the processing may be executed not only by hardware but also by software. In this case, for example, the above-mentioned series of the processing may be configured as an information processing system such as shown in FIG. 23.

FIG. 23 is a block diagram illustrating a configuration example of an information processing system which executes the above-mentioned series of processing by a program. As shown in FIG. 23, an information processing system 800 is a system for performing image encoding processing, image decoding processing, and so forth, configured of an information processing device 801, a storage device 803, multiple video tape recorders (VTR) VTR804-1 through VTR804-S, to which the operation input is performed by the user employing the following, a mouse 805, a keyboard 806, and an operation controller 807, which are all connected to the information processing device 801 by a PCI (Peripheral Components Interconnect) bus 802.

For example, the information processing device 801 of the information processing system 800 allows the user to encode a moving image content stored in the large-capacity storage device 803 made up of RAID (Redundant Arrays of Independent Disks) to store the obtained encoded data in the storage device 803, to decode the encoded data stored in the storage device 803 to store the obtained decoded image data (moving image content) in the storage device 803, or to record the encoded data or decoded image data in a video tape via the VTR804-1 through VTR804-S. Also, the information processing device 801 is also arranged to fetch the moving image content recorded in the video tape mounted in the VTR804-1 through VTR804-S in the storage device 803. At this time, the information processing device 801 may encode the moving image content.

The information processing device 801 includes a GPU (Graphics Processing Unit) 902, XDR-RAM (Extreme Data Rate—Random Access Memory) 903, south bridge 904, HDD (Hard Disk Drive) 905, USB (Universal Serial Bus) interface (USB I/F) 906, and sound input/output codec 907.

The GPU 902 is connected to the microprocessor 901 via a dedicated bus 911. The XDR-RAM 903 is connected to the microprocessor 901 via a dedicated bus 912. The south bridge 904 is connected to the I/O controller 944 of the microprocessor 901 via a dedicated bus. The south bridge 904 is also connected with the HDD 905, USB interface 906, and sound input/output codec 907. The sound input/output codec 907 is connected with a speaker 921. Also, the GPU 902 is connected with a display 922.

Also, the south bridge 904 is further connected with the mouse 805, keyboard 806, VTR804-1 through VTR804-S, storage device 803, and operation controller 807 via the PCI bus 802.

The mouse 805 and keyboard 806 accepts the user's operation input, and supplies a signal indicating the content of the user's operation input to the microprocessor 901 via the PCI bus 802 and south bridge 904. The storage device 803 and VTR804-1 through VTR804-S are arranged to record or reproduce predetermined data.

The PCI bus 802 is further connected with a drive 808 as appropriate, to which a removable medium 811 such as a magnetic tape, optical disc, magneto-optical disk, semiconductor memory, or the like is mounted, and a computer program read out therefrom is installed in the HDD 905 as appropriate.

The microprocessor 901 is made up of a multi-core configuration wherein a general-purpose main CPU (Central Processing Unit) core 941 which executes a basic program such an OS (Operating System) or the like, sub CPU cores 942-1 through 942-8 which are multiple (eight in this case) RISC (Reduced Instruction Set Computer) type signal processing processors connected to the main CPU core 941 via an internal bus 945, a memory controller 943 which performs memory control as to the XDR-PAM 903 having, for example, memory capacity of 256 Mbytes, and an I/O (Input/Output) controller 944 which manages input/output of data as to the south bridge 904, are integrated into one chip, and realizes, for example, an operation frequency of 4 GHz.

The microprocessor 901 reads out an appropriate application program stored in the HDD 905 based on the control program stored in the HDD 905 at the time of start-up and loads this in the XDR-RAM 903, and then executes appropriate control processing based on this application program and operator operations.

For example, of the configuration of the image synthesizing device 111 shown in FIG. 2, processing performed by the processing units included in a portion surrounded with a dotted line 121, i.e., the preprocessing such as the IP conversion and so forth, the information read-out control processing, and so forth are executed by the microprocessor 901, processing preformed by the processing units included in a portion surrounded with a dotted line 122, i.e., the processing relating to images such as clipping of images, size correction, various types of synthesizing, and so forth is executed by the GPU 902.

Note that the storage unit 132 is realized by, for example, the HDD 905, storage device 803, drive 808 on which the removable medium 811 is mounted, or the like, and the input unit 133 is realized by, for example, the mouse 805, keyboard 806, USB I/F 906, unshown network interface, and so forth. Also, with the information read-out control unit 131, each process performed by the decoding unit 181, dividing unit 182, decoding unit 184, and extracting unit 185 is executed by the microprocessor 901, and the holding unit 183 is realized by the XDR-RAM 903.

Note that the microprocessor 901 includes the multiple cores, so execution of processes is parallelized as appropriate, whereby multiple processes can also be advanced simultaneously in parallel. Also, assignment of a core as to each process is also optional.

In a case where the above-mentioned series of processes are executed by software, the program making up the software thereof is installed from the network or recording medium.

This recording medium is, for example, as shown in FIG. 23, configured not only by the removable medium 811 made up of a magnetic disk (including flexible disks), optical disc (including CD-ROM, and DVD), magneto-optical disk (including MD), semiconductor memory, or the like which stores the program, distributed for distributing the program to users, separately from the device main unit, but also the HDD 905, storage device 803, or the like which stores the program, distributed in a state embedded in the device main unit. It goes without saying that the recording medium may be semiconductor memory such as ROM, flash memory, or the like.

Description has been made so far wherein the eight sub CPU cores are provided within the microprocessor 901, but the present invention is not restricted to this, and the number of CPU cores is optional. Also, the microprocessor 901 does not have to be configured of multiple cores such as the main CPU core, and sub CPU cores, or may employ a CPU configured of a single core (one core). Also, instead of the microprocessor 901, multiple CPUs may be employed, or multiple information processing devices may be employed (i.e., the program for executing the processes of the present invention may be executed at multiple devices which operate in a collaborating manner).

Note that the respective steps according to the present Specification include not only processing performed in time sequence in accordance with the described sequence but also processing not necessarily performed in time sequence but performed in parallel or individually.

Also, with the present Specification, the term "system" represents the entirety of equipment device configured of multiple devices.

Note that, with the above description, an arrangement may be made wherein the configuration described as a single device is divided, and is configured as multiple devices. Conversely, the configurations described as multiple devices may be integrated as a single device. Also, it goes without saying that a configuration other than the above-mentioned configurations may be appended to the configuration of each device. Further, in a case where the configuration and operation as the entire system is substantially the same, a portion of the configuration of a certain device may be included in the configuration of another device. That is to say, the embodiments of the present invention are not restricted to the above-mentioned embodiment, and various modifications can be performed without departing from the essence of the present invention.

The present application contains subject matter related to that disclosed in Japanese Priority Patent Application JP filed in the Japan Patent Office on Apr. 11, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device comprising:
    a storage unit configured to store first control information, the first control information being a plurality of synthetic patterns and whole mask image information identifying all clipping shapes and sizes of each of a plurality of images;
    a clipping unit configured to subject a plurality of images to clipping processing based on the first control information to clip a part of an image as a partial image in a shape designated by the first control information, the clipping processing clipping a partial image from each of said plurality of images;
    a size correcting unit configured to change an image size of each partial image based on the first control information after being clipped by said clipping unit; and
    a synthesizing unit configured to add, at predetermined intervals within a predetermined period of time and via a processor, said partial images of which the image sizes have been changed by said size correcting unit to a synthetic image in an order based on a synthetic pattern to generate after the predetermined period of time has elapsed a final synthetic image containing the plurality of images connected in an order based on the clipping shapes and sizes identified in the first control information; and
    a progress control instructions accepting unit configured to receive a progress control instruction for controlling progress of said synthetic pattern,
    wherein the progress control instruction is at least one of an instruction to increase or decrease a speed at which partial images are added to the synthetic image based on the synthetic pattern.

2. The information processing device according to claim 1, further comprising:
    a CG information synthesizing unit configured to superimpose CG (Computer Graphics) information on said final synthetic image generated by said synthesizing unit in accordance with a superimposing technique specified with second control information to specify a connecting technique of the plurality of images.

3. The information processing device according to claim 2, wherein the storage unit stores second control information, and the information process device further comprises:
    a read-out unit configured to read out said first control information and said second control information from said storage unit to supply said first control information to said clipping unit, said size correcting unit, and said synthesizing unit, and supply said second control information to said CG information synthesizing unit.

4. The information processing device according to claim 3, wherein
    said read-out unit generates partial control information which is control information as to each image based on said first control information read out from said storage unit to supply a plurality of generated partial control information to said clipping unit and said size correcting unit,
    said clipping unit performs clipping of each partial image via a clipping technique specified with partial control information corresponding to each image, and
    said size correcting unit changes each partial image so as to have an image size specified with partial control information corresponding to each partial image.

5. The information processing device according to claim 3, wherein
    said first control information and said second control information stored in said storage unit are compressed with predetermined techniques, respectively, and
    said read-out unit decodes said first control information and said second control information read out from said storage unit by techniques corresponding to the compression techniques, and then supplies said first control information and said second control information.

6. The information processing device according to claim 3, wherein
    said storage unit manages said second control information for the plurality of synthetic patterns,
    and said read-out unit reads out said first control information and said second control information having a specified synthetic pattern from said storage unit, and then supplies said first control information and said second control information.

7. The information processing device according to claim 6, further comprising:
    a progress control instructions accepting unit configured to accept a progress control instruction for controlling progress of said synthetic pattern;
    wherein said read-out unit determines a position to be processed with said synthetic pattern based on said progress control instruction accepted by said progress control instructions accepting unit, and reads out said first control information and said second control information corresponding to said position to be processed, and then supplies said first control information and said second control information.

8. The information processing device according to claim 3, further comprising:
    a modification instructions accepting unit configured to accept a modification instruction having a configuration of said CG information,
    wherein said read-out unit updates said first control information and said second control information based on said modification instruction accepted by said modification instructions accepting unit.

9. The information processing device according to claim 2, wherein the progress control instruction instructs the synthesizing unit to modify a shape of the CG information and a location at which the CG information is superimposed on the final synthetic image.

10. The information processing device according to claim 1, further comprising:
a preprocessing unit configured to subject said plurality of images to preprocessing,
wherein said clipping unit clips each partial image from said plurality of images subjected to the preprocessing by said preprocessing unit.

11. The information processing device according to claim 10, wherein said preprocessing unit converts said plurality of images of an interlace form into those of a progressive form.

12. The information processing device according to claim 10, wherein said preprocessing unit detects a face image from each of said plurality of images to determine the center coordinates of each partial image clipped by said clipping unit.

13. The information processing device according to claim 1, wherein
the first control information further includes at least one of the central angle, rotation angle and reduction ratio, and
the clipping unit performs the clipping based on the first control information.

14. The information processing device according to claim 1, wherein the synthesizing unit simultaneously connects the partial images.

15. The information processing device according to claim 1, wherein each synthetic pattern identifies a sequence at which the partial images are added to the synthetic image at each interval to generate the final synthetic image.

16. The information processing device according to claim 1, wherein the progress control instruction is an instruction to have the synthesizing unit generate the final synthetic image based on an inverted synthetic pattern.

17. The information processing device according to claim 1, wherein the progress control instruction instructs the synthesizing unit to prevent a predetermined amount of partial images from being added to the synthetic image based on the synthetic pattern.

18. An information processing method for an information processing device, comprising:
storing first control information, the first control information being a plurality of synthetic patterns and whole mask image information identifying all clipping shapes and sizes of each of a plurality of images;
subjecting a plurality of images to clipping processing based on the first control information to clip a part of an image as a partial image in a shape designated by the first control information, the clipping processing clipping a partial image from each of said plurality of images;
changing an image size of each partial image based on the first control information after being clipped in the subjecting step;
adding, at predetermined intervals within a predetermined period of time and via a processor, said partial images of which the image sizes have been changed to a synthetic image in an order based on a synthetic pattern to generate after the predetermined period of time has elapsed a final synthetic image containing the plurality of images connected in an order based on the clipping shapes and sizes identified in the first control information; and
receiving a progress control instruction for controlling progress of said synthetic pattern,
wherein the progress control instruction is at least one of an instruction to increase or decrease a speed at which partial images are added to the synthetic image based on the synthetic pattern.

19. A non-transitory computer-readable medium storing computer readable instructions thereon that when executed by an information processing device cause the information processing device to perform a method comprising:
storing first control information, the first control information being whole mask image information identifying all clipping shapes and sizes of each of a plurality of images;
subjecting a plurality of images to clipping processing based on the first control information to clip a part of an image as a partial image in a shape designated by the first control information, the clipping processing clipping a partial image from each of said plurality of images;
changing an image size of each partial image based on the first control information after being clipped in the subjecting step;
adding, at predetermined intervals within a predetermined period of time, said partial images of which the image sizes have been changed to a synthetic image in an order based on a synthetic pattern to generate after the predetermined period of time has elapsed a final synthetic image containing the plurality of images connected in an order based on the clipping shapes and sizes identified in the first control information; and
receiving a progress control instruction for controlling progress of said synthetic pattern,
wherein the progress control instruction is at least one of an instruction to increase or decrease a speed at which partial images are added to the synthetic image based on the synthetic pattern.

20. An information processing device comprising:
storing means for storing first control information, the first control information being whole mask image information identifying all clipping shapes and sizes of each of a plurality of images;
clipping means for subjecting a plurality of images to clipping processing based on the first control information to clip a part of an image as a partial image in a shape designated by the first control information, the clipping processing clipping a partial image from each of said plurality of images;
size correcting means for changing an image size of each partial image based on the first control information after being clipped by said clipping means;
synthesizing means for adding, at predetermined intervals within a predetermined period of time, said partial images of which the image sizes have been changed by said size correcting means to a synthetic image in an order based on a synthetic pattern to generate after the predetermined period of time has elapsed a final synthetic image containing the plurality of images connected in an order based on the clipping shapes and sizes identified in the first control information; and
progress control instructions accepting means for receiving a progress control instruction for controlling progress of said synthetic pattern,
wherein the progress control instruction is at least one of an instruction to increase or decrease a speed at which partial images are added to the synthetic image based on the synthetic pattern.

* * * * *